(12) United States Patent
Trudeau, Jr. et al.

(10) Patent No.: US 10,488,092 B2
(45) Date of Patent: Nov. 26, 2019

(54) SYSTEM AND METHOD OF CONTROLLING A VARIABLE-CAPACITY COMPRESSOR

(71) Applicant: Emerson Climate Technologies, Inc., Sidney, OH (US)

(72) Inventors: Edward J. Trudeau, Jr., Covington, OH (US); Sahil Popli, Troy, OH (US); Hung M. Pham, Dayton, OH (US)

(73) Assignee: Emerson Climate Technologies, Inc., Sidney, OH (US)

(*) Notice: Subject to any disclaimer, the term of this patent is extended or adjusted under 35 U.S.C. 154(b) by 347 days.

(21) Appl. No.: 15/138,771

(22) Filed: Apr. 26, 2016

(65) Prior Publication Data

US 2016/0313040 A1    Oct. 27, 2016

Related U.S. Application Data

(60) Provisional application No. 62/309,247, filed on Mar. 16, 2016, provisional application No. 62/153,209, filed on Apr. 27, 2015.

(51) Int. Cl.
*F25B 49/02* (2006.01)
*F25B 13/00* (2006.01)
(Continued)

(52) U.S. Cl.
CPC ............ *F25B 49/022* (2013.01); *F24F 11/30* (2018.01); *F24F 11/83* (2018.01); *F25B 13/00* (2013.01);
(Continued)

(58) Field of Classification Search
CPC .......... F25B 2600/01; F25B 2600/0252; F25B 2600/11; F25B 2313/005; F25B 2313/007
(Continued)

(56) References Cited

U.S. PATENT DOCUMENTS 4,228,846 A    10/1980    Smorol
4,257,238 A *   3/1981    Kountz ................ F24F 11/0009
                                                             62/176.3
(Continued)

FOREIGN PATENT DOCUMENTS

AU          744608 B2    2/2002
CN         1239211 A    12/1999
(Continued)

OTHER PUBLICATIONS

International Search Report regarding International Application No. PCT/US2016/029588, dated Aug. 9, 2016.
(Continued)

*Primary Examiner* — Elizabeth J Martin
(74) *Attorney, Agent, or Firm* — Harness, Dickey & Pierce, P.L.C.

(57) ABSTRACT

A system includes a variable-capacity compressor operable in a first capacity mode and in a second capacity mode that is higher than the first capacity mode. A variable-speed blower is operable at a first speed and at a second speed that is higher than the first speed. A control module is configured to (i) receive indoor relative humidity data corresponding to an indoor relative humidity (ii) switch the variable-capacity compressor between the first capacity mode and the second capacity mode based on a demand signal from a thermostat and the indoor relative humidity and (iii) switch the variable-speed blower between the first speed and the second speed based on the demand signal from the thermostat and the indoor relative humidity.

20 Claims, 20 Drawing Sheets

(51) Int. Cl.
*F25B 49/00* (2006.01)
*F24F 11/83* (2018.01)
*F24F 11/30* (2018.01)
*F24F 110/12* (2018.01)
*F24F 110/20* (2018.01)
*F24F 110/10* (2018.01)

(52) U.S. Cl.
CPC ....... *F24F 2110/10* (2018.01); *F24F 2110/12* (2018.01); *F24F 2110/20* (2018.01); *F25B 2313/0314* (2013.01); *F25B 2600/021* (2013.01); *F25B 2700/2106* (2013.01); *Y02B 30/741* (2013.01)

(58) Field of Classification Search
USPC ...................................................... 62/176.6
See application file for complete search history.

(56) References Cited

U.S. PATENT DOCUMENTS

| | | | |
|---|---|---|---|
| 5,062,276 A * | 11/1991 | Dudley | F24F 11/00 62/176.6 |
| 5,129,234 A * | 7/1992 | Alford | G05D 22/02 62/176.6 |
| 5,381,669 A | 1/1995 | Bahel et al. | |
| 5,385,453 A | 1/1995 | Fogt et al. | |
| 6,213,731 B1 | 4/2001 | Doepker et al. | |
| 6,293,116 B1 | 9/2001 | Forrest et al. | |
| 6,318,101 B1 | 11/2001 | Pham et al. | |
| 6,450,409 B1 | 9/2002 | Rowlette et al. | |
| 6,578,373 B1 | 6/2003 | Barbier | |
| 6,679,072 B2 | 1/2004 | Pham et al. | |
| 7,752,854 B2 | 7/2010 | Singh et al. | |
| 7,845,179 B2 | 12/2010 | Singh et al. | |
| 8,011,199 B1 | 9/2011 | Chen et al. | |
| 8,209,073 B2 | 6/2012 | Wijaya et al. | |
| 8,418,483 B2 | 4/2013 | McSweeney et al. | |
| 8,459,053 B2 | 6/2013 | Pham et al. | |
| 8,485,789 B2 | 7/2013 | Gu et al. | |
| 8,538,587 B2 | 9/2013 | Hess et al. | |
| 8,585,382 B2 | 11/2013 | Akei et al. | |
| 8,616,014 B2 | 12/2013 | Stover et al. | |
| 8,863,536 B1 | 10/2014 | Perry et al. | |
| 9,194,393 B2 | 11/2015 | Pham | |
| 9,562,710 B2 | 2/2017 | Pham et al. | |
| 9,709,311 B2 | 7/2017 | Popli et al. | |
| 2003/0033823 A1 | 2/2003 | Pham et al. | |
| 2003/0156946 A1 | 8/2003 | Tolbert | |
| 2005/0155369 A1* | 7/2005 | Ootori | F25B 49/025 62/228.1 |
| 2005/0257538 A1 | 11/2005 | Hwang et al. | |
| 2006/0032253 A1 | 2/2006 | Lee et al. | |
| 2006/0037332 A1 | 2/2006 | Hwang et al. | |
| 2006/0156749 A1 | 7/2006 | Lee et al. | |
| 2006/0260334 A1* | 11/2006 | Carey | F24F 3/1405 62/176.6 |
| 2006/0280627 A1 | 12/2006 | Jayanth | |
| 2007/0012052 A1 | 1/2007 | Butler et al. | |
| 2007/0032909 A1 | 2/2007 | Tolbert et al. | |
| 2007/0079620 A1 | 4/2007 | Lee | |
| 2007/0151267 A1 | 7/2007 | Hatano et al. | |
| 2008/0135635 A1 | 6/2008 | Deng et al. | |
| 2008/0286118 A1 | 11/2008 | Gu et al. | |
| 2009/0159716 A1 | 6/2009 | Kim | |
| 2010/0064714 A1 | 3/2010 | Tashiro | |
| 2010/0082162 A1 | 4/2010 | Mundy et al. | |
| 2010/0107668 A1* | 5/2010 | Voorhis | F24F 3/153 62/176.3 |
| 2010/0179703 A1 | 7/2010 | Singh et al. | |
| 2010/0218527 A1 | 9/2010 | Kitagishi et al. | |
| 2010/0268397 A1 | 10/2010 | Whitehurst et al. | |
| 2010/0275628 A1 | 11/2010 | Moseley | |
| 2010/0314458 A1 | 12/2010 | Votaw et al. | |
| 2011/0014890 A1 | 1/2011 | Ajram et al. | |
| 2012/0090337 A1 | 4/2012 | Chen et al. | |
| 2012/0185728 A1 | 7/2012 | Guo et al. | |
| 2012/0297805 A1 | 11/2012 | Kamada et al. | |
| 2012/0318007 A1 | 12/2012 | Lukasse et al. | |
| 2014/0033746 A1 | 2/2014 | McSweeney | |
| 2014/0262134 A1 | 9/2014 | Arensmeier et al. | |
| 2015/0219356 A1 | 8/2015 | Ito et al. | |
| 2016/0313039 A1 | 10/2016 | Popli et al. | |
| 2016/0313042 A1 | 10/2016 | Popli et al. | |
| 2017/0268812 A1 | 9/2017 | Trudeau et al. | |
| 2017/0343230 A1 | 11/2017 | Popli et al. | |
| 2017/0350633 A1 | 12/2017 | Popli et al. | |
| 2019/0170417 A1 | 6/2019 | Popli et al. | |

FOREIGN PATENT DOCUMENTS

| | | |
|---|---|---|
| CN | 1291702 A | 4/2001 |
| CN | 1482408 A | 3/2004 |
| CN | 1517624 A | 8/2004 |
| CN | 1699865 A | 11/2005 |
| CN | 1796879 A | 7/2006 |
| CN | 1873352 A | 12/2006 |
| CN | 1991173 A | 7/2007 |
| CN | 101109553 A | 1/2008 |
| CN | 101137873 A | 3/2008 |
| CN | 101464022 A | 6/2009 |
| CN | 103216910 A | 7/2013 |
| EP | 1398576 A2 | 3/2004 |
| EP | 1684025 A1 | 7/2006 |
| EP | 2050958 A1 | 4/2009 |
| EP | 2443403 A1 | 4/2012 |
| EP | 2772699 A1 | 9/2014 |
| JP | H03160261 A | 7/1991 |
| JP | H09318140 A | 12/1997 |
| KR | 100715999 B1 | 5/2007 |
| KR | 20070071090 A | 7/2007 |
| KR | 20080089967 A | 10/2008 |
| KR | 20100059522 A | 6/2010 |
| KR | 20130033847 A | 4/2013 |
| WO | WO-2007130051 A1 | 11/2007 |
| WO | WO-2009061301 A1 | 5/2009 |
| WO | WO-2013149210 A1 | 10/2013 |
| WO | WO-2014017316 A1 | 1/2014 |
| WO | WO-2015153766 A1 | 10/2015 |

OTHER PUBLICATIONS

Written Opinion of the International Searching Authority regarding International Application No. PCT/US2016/029588, dated Aug. 9, 2016.
International Search Report regarding International Application No. PCT/US2016/029593, dated Aug. 10, 2016.
Written Opinion of the International Searcing Authority regarding International Application No. PCT/US2016/029593, dated Aug. 10, 2016.
International Search Report regarding International Application No. PCT/US2016/029543, dated Aug. 9, 2016.
Written Opinion of the International Searching Authority regarding International Application No. PCT/US2016/029543, dated Aug. 9, 2016.
International Search Report regarding International Application No. PCT/US2017/022563, dated Jun. 26, 2017.
Written Opinion of the International Searching Authority regarding International Application No. PCT/US2017/022563, dated Jun. 26, 2017.
International Search Report regarding International Application No. PCT/US2017/034510, dated Aug. 28, 2017.
Written Opinion of the International Searching Authority regarding International Application No. PCT/US2017/034510, dated Aug. 28, 2017.
Notice of Allowance and Fees Due dated May 25, 2017.
International Search Report regarding International Application No. PCT/US2016/029536, dated Sep. 12, 2016.
Written Opinion of the International Searching Authority regarding International Application No. PCT/US2016/029536, dated Sep. 12, 2016.

(56) References Cited

OTHER PUBLICATIONS

Notice of Allowance regarding U.S. Appl. No. 15/651,942 dated Jul. 9, 2018.
Notice of Allowance regarding U.S. Appl. No. 15/138,981, dated Jul. 2, 2018.
Office Action regarding U.S. Appl. No. 15/457,418, dated Jul. 26, 2018.
Notice of Allowance regarding U.S. Appl. No. 15/651,942 dated Aug. 16, 2018.
Notice of Allowance regarding U.S. Appl. No. 15/457,418 dated Feb. 7, 2019.
First Examination Report for Indian Application No. 201621018358 dated Mar. 27, 2019, 6 pages.
European Search Report regarding European Application No. 16787055.9, dated Mar. 27, 2019.
Notice of Allowance regarding U.S. Appl. No. 15/457,418 dated May 1, 2019.
Corrected Notice of Allowability regarding U.S. Appl. No. 15/457,418 dated May 10, 2019.
Notice of Allowability and Applicant-Initiated Interview Summary regarding U.S. Appl. No. 15/457,418 dated Jun. 3, 2019.
Notice of Allowance regarding U.S. Appl. No. 16/193,310 dated Jul. 8, 2019.
Office Action regarding Chinese Patent Application No. 201680032857.9, dated Jul. 3, 2019. Translation provided by Unitalen Attorneys at Law.
Office Action regarding Chinese Patent Application No. 201680031951.2, dated Jul. 3, 2019. Translation provided by Unitalen Attorneys at Law.
Office Action regarding Chinese Patent Application No. 201680030841.4, dated Jun. 24, 2019. Translation provided by Unitalen Attorneys at Law.
Notice of Allowance regarding U.S. Appl. No. 16/193,310 dated Aug. 14, 2019.

* cited by examiner

| OAT (°F) | BASELINE T1 | OVERRIDE T1 |
|---|---|---|
| >90 | 5 seconds | If $T2_{n-1}>5\text{min}$, then $T1_n=5\text{sec}$, else $T1_n=40\text{min}$ |
| 85-90 | 30 minutes | If $T2_{n-1}>5\text{min}$, then $T1_n=5\text{sec}$, else $T1_n=40\text{min}$ |
| 80-85 | 35 minutes | Not applicable. See Baseline T1 Column. |
| 75-80 | 40 minutes | Not applicable. See Baseline T1 Column. |
| 70-75 | 50 minutes | Not applicable. See Baseline T1 Column. |
| 65-60 | 60 minutes | Not applicable. See Baseline T1 Column. |
| 60-65 | 60 minutes | Not applicable. See Baseline T1 Column. |
| 55-60 | 50 minutes | Not applicable. See Baseline T1 Column. |
| 50-55 | 40 minutes | Not applicable. See Baseline T1 Column. |
| 45-50 | 40 minutes | Not applicable. See Baseline T1 Column. |
| 40-45 | 30 minutes | If $T2_{n-1}>5\text{min}$, then $T1_n=5\text{sec}$, else $T1_n=20\text{min}$ |
| <40 | 5 seconds | If $T2_{n-1}>5\text{min}$, then $T1_n=5\text{sec}$, else $T1_n=20\text{min}$ |

FIG. 3

| OAT (°F) | BASELINE T1 | POSITIVE OAT SLOPE | NEGATIVE OAT SLOPE | EXTREME NEGATIVE OAT SLOPE |
|---|---|---|---|---|
| >90 | 30 minutes | If $T2_{n-1} > 5min$, then $T1_n = 5sec$, else $T1_n = 30min$ | If $T2_{n-1} > 5min$, then $T1_n = 5sec$, else $T1_n = 25min$ | $T1_n = 2min$ |
| 85-90 | 30 minutes | If $T2_{n-1} > 5min$, then $T1_n = 5sec$, else $T1_n = 50min$ | If $T2_{n-1} > 5min$, then $T1_n = 5sec$, else $T1_n = 25min$ | $T1_n = 4min$ |
| 80-85 | 40 minutes | If $T2_{n-1} > 5min$, then $T1_n = 5sec$, else $T1_n = 55min$ | If $T2_{n-1} > 5min$, then $T1_n = 5sec$, else $T1_n = 30min$ | $T1_n = 8min$ |
| 75-80 | 40 minutes | If $T2_{n-1} > 10min$, then $T1_n = 5sec$, else $T1_n = 60min$ | If $T2_{n-1} > 10min$, then $T1_n = 5sec$, else $T1_n = 40min$ | $T1_n = 10min$ |
| 45-75 | 60 minutes | $T1 = 60$ | $T1 = 60$ | |
| 35-45 | 40 minutes | If $T2_{n-1} > 5min$, then $T1_n = 5sec$, else $T1_n = 30min$ | If $T2_{n-1} > 5min$, then $T1_n = 5sec$, else $T1_n = 40min$ | $T1_n = 10min$ |
| 30-35 | 30 minutes | If $T2_{n-1} > 5min$, then $T1_n = 5sec$, else $T1_n = 20min$ | If $T2_{n-1} > 5min$, then $T1_n = 5sec$, else $T1_n = 40min$ | Not Applicable. See Negative OAT Slope Column |
| <30 | 20 minutes | If $T2_{n-1} > 5min$, then $T1_n = 5sec$, else $T1_n = 15min$ | If $T2_{n-1} > 5min$, then $T1_n = 5sec$, else $T1_n = 20min$ | |

FIG. 4

| Region | Sensible Load (Temperature) | Latent Load (Humidity) | Indoor Blower Speed |
|---|---|---|---|
| Hot and Humid | Medium/low | High | Low |
| Very Hot/Dry | High | Low | High |
| Mixed-Mild | Medium/low | Low | Low/Medium |
| Mixed-Humid | Medium/low | Medium | Low |

FIG. 6

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Low | Low | Medium | Medium/Low |
| Latent Load | Medium | High | Very High | High |

FIG. 7

| Region- Very Hot/Dry | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 + reducing Y2 |
| Ambient temperature Slope | Neutral | Positive | Reducing | Reducing/ Neutral |
| Sensible Load | Medium | Med/High | High | Med/Low |
| Latent Load | | | Low | |

FIG. 8

| Region-Mixed-Mild | 12 AM to 6 AM | 6 AM to 12 PM | 12 PM to 6 PM | 6 PM to 12AM |
|---|---|---|---|---|
| Y1/Y2 setting | Y1 | Y1 | Y1 + more Y2 | More Y1 + reducing Y2 |
| Ambient temperature Slope | Neutral | Positive | Reducing | Reducing/ Neutral |
| Sensible Load | Low | Low | Medium/High | Medium/Low |
| Latent Load | | | Low | |

FIG. 9

| Region- Hot and Humid | 12 AM to 6 AM | 6 AM to 12 PM | 12 PM to 6 PM | 6 PM to 12AM |
|---|---|---|---|---|
| Y1/Y2 setting | Y1 | More Y1 + Y2 | Y1 + more Y2 | Y1 |
| Ambient temperature Slope | Neutral | Positive | Reducing | Reducing/ Neutral |
| Sensible Load | Low | Low | Medium/High | Medium/Low |
| Latent Load | Low | Low | Medium | Medium/Low |

FIG. 10

| Region | Initial Mode | If After 10 Min RT the Following Conditions Exist | Switch to Mode |
|---|---|---|---|
| Low Humidity Low Temperature | 1 | ID RH > 50 % | 3 |
| | | ID RH < 50 % & OAT > 90° F | 4 |
| Low Humidity High Temperature | 4 | ID RH > 50 % | 3 |
| | | ID RH < 50 % & OAT < 80° F | 1 |
| High Humidity | 3 | ID RH < 50 % & OAT > 90° F | 4 |
| | | ID RH < 50 % & OAT < 90° F | 1 |

FIG - 15

|         | Comp Low | Comp High |
|---------|----------|-----------|
| Fan High | Mode 2 (Very high sensible) | Mode 4 (max sensible) |
| Fan Low | Mode 1 (medium sensible and latent) | Mode 3 (max dehumidification) |

FIG - 16

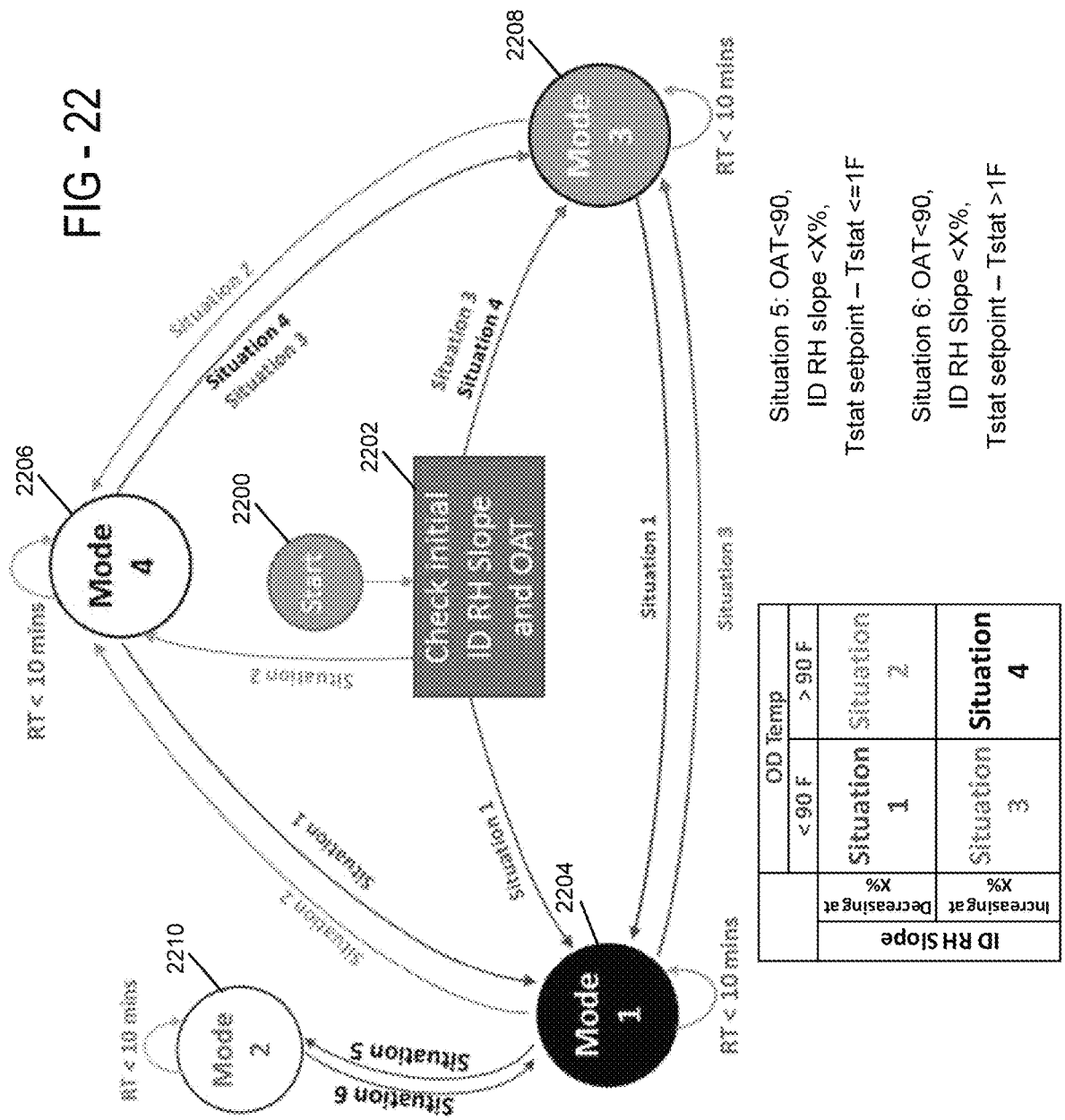

SYSTEM AND METHOD OF CONTROLLING A VARIABLE-CAPACITY COMPRESSOR

CROSS-REFERENCE TO RELATED APPLICATIONS

This application claims the benefit of U.S. Provisional Application No. 62/153,209, filed on Apr. 27, 2015, and U.S. Provisional Application No. 62/309,247, filed on Mar. 16, 2016. The entire disclosures of the above applications are incorporated herein by reference.

FIELD

The present disclosure relates to a climate-control system having a variable-capacity compressor and to methods for controlling the climate-control system.

BACKGROUND

This section provides background information related to the present disclosure and is not necessarily prior art.

A climate-control system such as, for example, a heat-pump system, a refrigeration system, or an air conditioning system, may include a fluid circuit having an outdoor heat exchanger, an indoor heat exchanger, an expansion device disposed between the indoor and outdoor heat exchangers, and a compressor circulating a working fluid (e.g., refrigerant or carbon dioxide) between the indoor and outdoor heat exchangers. Varying a capacity of the compressor can impact the energy-efficiency of the system and the speed with which the system is able to heat or cool a room or space.

SUMMARY

This section provides a general summary of the disclosure, and is not a comprehensive disclosure of its full scope or all of its features.

In one form, the present disclosure provides a system that may include: a variable-capacity compressor, a variable-speed blower, a control module, and a thermostat. The variable-capacity compressor may be operable in a first capacity mode and in a second capacity mode that is higher than the first capacity mode. The variable-speed blower may be operable at a first speed and at a second speed that is higher than the first speed. The control module may be configured to: (i) receive indoor relative humidity data corresponding to an indoor relative humidity; (ii) switch the variable-capacity compressor between the first capacity mode and the second capacity mode based on a demand signal from a thermostat and the indoor relative humidity; and (iii) switch the variable-speed blower between the first speed and the second speed based on the demand signal from the thermostat and the indoor relative humidity.

In some configurations, the system includes an indoor relative humidity sensor that generates the indoor relative humidity data.

In some configurations, the system includes an outdoor-air-temperature sensor that generates outdoor-air-temperature data, wherein the control module switches the variable-capacity compressor between the first capacity mode and the second capacity mode and switches the variable-speed blower between the first speed and the second speed based on the outdoor-air-temperature.

In some configurations, the control module determines a slope of the indoor relative humidity, switches the variable-capacity compressor between the first capacity mode and the second capacity mode and switches the variable-speed blower between the first speed and the second speed based on the slope of the indoor relative humidity.

In some configurations, the control module switches the variable-capacity compressor to the second capacity mode and switches the variable-speed blower to the first speed in response to the indoor relative humidity exceeding a predetermined threshold.

In some configurations, the control module switches the variable-capacity compressor to the second capacity mode and switches the variable-speed blower to the second speed in response to: (i) an outdoor-air-temperature exceeding a predetermined amount, and (ii) the indoor relative humidity being less than a predetermined threshold.

In some configurations, the control module switches the variable-capacity compressor to the first capacity mode and switches the variable-speed blower to the first speed in response to: (i) an outdoor-air-temperature being less than a predetermined amount, and (ii) the indoor relative humidity exceeding a predetermined threshold.

In some configurations, the thermostat is further configured to measure an indoor air temperature, receive a setpoint temperature, and generate the demand signal based on a difference between the indoor air temperature and the setpoint temperature.

In some configurations, the control module switches the variable-capacity compressor to the first capacity mode and switches the variable-speed blower to the second speed in response to a difference between the indoor air temperature and the setpoint temperature being less than less than a predetermined value.

In some configurations, the control module switches the variable-capacity compressor between the first capacity mode and the second capacity mode and switches the variable-speed blower between the first speed and the second speed based on a geographical region in which the system is installed.

In another form, the present disclosure provides a method of controlling a variable-capacity compressor and a variable-speed blower. The method may include receiving, with a control module, a demand signal from a thermostat. The method may also include operating, with the control module, a variable-capacity compressor, wherein the variable-capacity compressor is operable in a first capacity mode and in a second capacity mode that is higher than the first capacity mode. The method may also include operating, with the control module, a variable-speed blower, wherein the variable-speed blower operable at a first speed and at a second speed that is higher than the first speed. The method may also include receiving, with the control module, indoor relative humidity data corresponding to an indoor relative humidity. The method may also include switching, with the control module, the variable-capacity compressor between the first capacity mode and second capacity mode based on the demand signal and the indoor relative humidity. The method may also include switching, with the control module, the variable-speed blower between the first speed and the second speed based on the demand signal and the indoor relative humidity.

In some configurations, an indoor relative humidity sensor generates the indoor relative humidity data.

In some configurations, the method may also include receiving, with the control module, outdoor-air-temperature data corresponding to an outdoor-air-temperature from an outdoor-air-temperature sensor and switching, with the control module, the variable-capacity compressor between the first capacity mode and the second capacity mode and the variable-speed blower between the first speed and the second speed based on the outdoor-air-temperature.

In some configurations, the method may also include switching, with the control module, the variable-capacity compressor between the first capacity mode and the second capacity mode and the variable-speed blower between the first speed and the second speed based on the slope of the indoor relative humidity.

In some configurations, the method may also include switching, with the control module, the variable-capacity compressor to the second capacity mode and the variable-speed blower to the first speed in response to the indoor relative humidity exceeding a predetermined threshold.

In some configurations, the method may also include switching, with the control module, the variable-capacity compressor to the second capacity mode and the variable-speed blower to the second speed in response to: (i) an outdoor-air-temperature exceeding a predetermined amount, and (ii) the indoor relative humidity being less than a predetermined threshold.

In some configurations, the method may also include switching, with the control module, the variable-capacity compressor to the first capacity mode and the variable-speed blower to the first speed in response to: (i) an outdoor-air-temperature being less than a predetermined amount, and (ii) the indoor relative humidity exceeding a predetermined threshold.

In some configurations, the thermostat is further configured to measure an indoor air temperature, receive a setpoint temperature, and generate the demand signal based on a difference between the indoor air temperature and the setpoint temperature.

In some configurations, the method may also include switching, with the control module, the variable-capacity compressor to the first capacity mode and the variable-speed blower to the second speed in response to the difference between the indoor air temperature and the setpoint temperature being less than a predetermined value.

In some configurations, the method may also include switching, with the control module, the variable-capacity compressor between the first capacity mode and the second capacity mode and the variable-speed blower between the first speed and the second speed based on a geographical region.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a lookup table that can be used in the method and algorithm of FIG. 2;

FIG. 4 is another lookup table that can be used in the method and algorithm of FIG. 2;

FIG. 6 is a table illustrating relative sensible and latent loads for exemplary climate types;

FIG. 7 is a table providing data for a first climate type at various times of a day;

FIG. 8 is a table providing data for a second climate type at various times of a day;

FIG. 9 is a table providing data for a third climate type at various times of a day;

FIG. 10 is a table providing data for a fourth climate type at various times of a day;

FIG. 15 is a table providing operational modes based on regional data;

FIG. 16 is a table illustrating four operational modes for the variable-capacity compressor and the variable-speed indoor blower;

FIG. 22 is a state diagram illustrating another method and algorithm for controlling the variable-capacity compressor and the variable-speed indoor blower.

Corresponding reference numerals indicate corresponding parts throughout the several views of the drawings.

DETAILED DESCRIPTION

Figure 1:
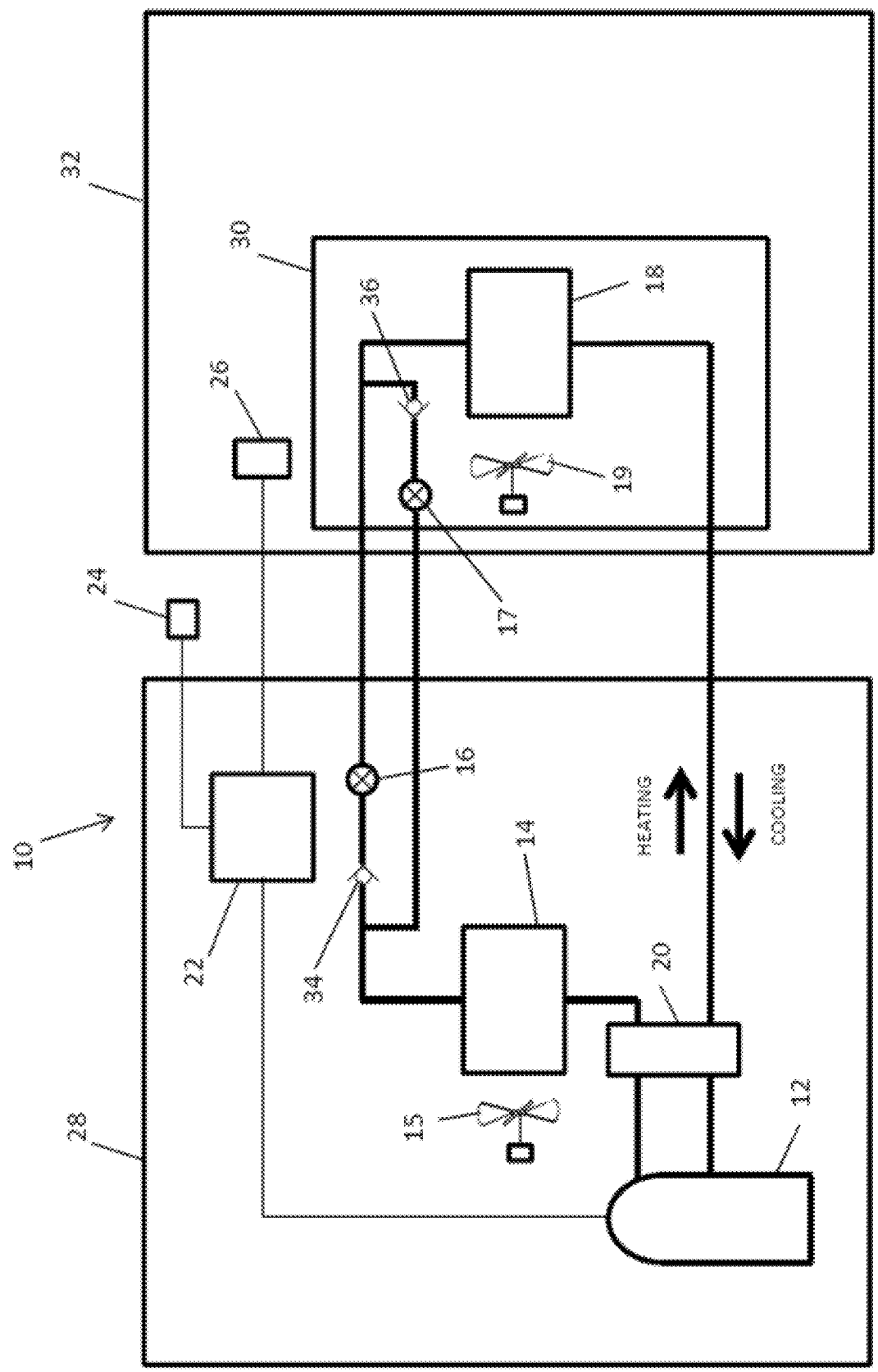
FIG. 1 is a schematic representation of a heat-pump system having a variable-capacity compressor according to the principles of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIG. 1, a climate-control system 10 is provided that may include a variable-capacity compressor (or a variable-capacity group of compressors) 12, an outdoor heat exchanger 14, an outdoor blower 15, a first expansion device 16, a second expansion device 17, an indoor heat exchanger 18, and an indoor blower 19. In the particular configuration shown in FIG. 1, the system 10 is a heat-pump system having a reversing valve 20 operable to control a direction of working fluid flow through the system 10 to switch the system 10 between a heating mode and a cooling mode. In some configurations, the system 10 may be an air-conditioning system or a refrigeration system, for example, and may be operable in only the cooling mode.

As will be described in more detail below, a controller or control module 22 may control operation of the compressor 12 and may switch the compressor 12 between a low-capacity mode and a high-capacity mode based on data received from an outdoor-air-temperature sensor 24, a signal received from a thermostat 26, a comparison between a runtime T of the compressor 12 and a predetermined low-capacity runtime T1, and/or a comparison between a previous high-capacity runtime T2 with a predetermined value. The control module 22 may minimize or reduce employment of high-capacity-mode operation to minimize or reduce energy usage while maintaining an acceptable level of comfort within a space to be heated or cooled.

The compressor 12 can be or include a scroll compressor, a reciprocating compressor, or a rotary vane compressor, for example, and/or any other type of compressor. The compressor 12 may be any type of variable-capacity compressor that is operable in at least a low-capacity mode and a high-capacity mode. For example, the compressor 12 may be or include a multi-stage compressor, a group of independently operable compressors, a multi-speed or variable-speed compressor (having a variable-speed or multi-speed motor), a compressor having modulated suction (e.g., blocked suction), a compressor having fluid-injection (e.g., an economizer circuit), a pulse-width-modulated scroll compressor configured for scroll separation (e.g., a digital scroll compressor), a compressor having variable-volume-ratio valves configured to leak intermediate-pressure working fluid, or a compressor having two or more of the above capacity modulation means. It will be appreciated that the compressor 12 could include any other additional or alternative structure for varying its capacity and/or the operating capacity of the system 10.

It will be appreciated that the low-capacity and/or high-capacity modes may be continuous, steady-state operating modes, or compressor 12 may be modulated (e.g., pulse-width-modulated) during operation in the low-capacity mode and/or during operation in the high-capacity mode. Exemplary variable-capacity compressors are disclosed in assignee's commonly owned U.S. Pat. Nos. 8,616,014, 6,679,072, 8,585,382, 6,213,731, 8,485,789, 8,459,053, and 5,385,453, the disclosures of which are hereby incorporated by reference.

The compressor 12, the outdoor heat exchanger 14, the outdoor blower 15, the first expansion device 16 and the reversing valve 20 may be disposed in an outdoor unit 28. The second expansion device 17, the indoor heat exchanger 18 and the indoor blower 19 may be disposed within an indoor unit 30 (e.g., an air handler or furnace) disposed within a home or other building 32. A first check valve 34 may be disposed between outdoor heat exchanger 14 and the first expansion device 16 and may restrict or prevent fluid flow through the first expansion device 16 in the cooling mode and may allow fluid flow through the first expansion device 16 in the heating mode. A second check valve 36 may be disposed between the second expansion device 17 and the indoor heat exchanger 18 and may restrict or prevent fluid flow through the second expansion device 17 in the heating mode and may allow fluid flow through the second expansion device 17 in the cooling mode.

The outdoor-air-temperature sensor 24 is disposed outside of the building 32 and within or outside of the outdoor unit 28 and is configured to measure an outdoor ambient air temperature and communicate the outdoor ambient air temperature value to the control module 22 intermittently, continuously or on-demand. In some configurations, the outside-air-temperature sensor 24 could be a thermometer or other sensor associated with a weather monitoring and/or weather reporting system or entity. In such configurations, the control module 22 may obtain the outdoor-air temperature (measured by the sensor 24) from the weather monitoring and/or weather reporting system or entity via, for example, an internet, Wi-Fi, Bluetooth®, Zigbee®, power-line carrier communication (PLCC), or cellular connection or any other wired or wireless communication protocol.

For example, the control module 22 may communicate with the weather monitoring and/or weather reporting system or entity over the internet via a Wi-Fi connection to a Wi-Fi router located in or associated with the building 32. The thermostat 26 is disposed inside of the building 32 and outside of the indoor unit 30 and is configured to measure an air temperature within a room or space to be cooled or heated by the system 10. The thermostat 26 can be a single-stage thermostat, for example, that generates only one type of demand signal in response to a temperature within the room or space rising above (in the cooling mode) or falling below (in the heating mode) a setpoint temperature. The control module 22 could be disposed in any suitable location, such as inside of or adjacent to the outdoor unit 28 or inside of or adjacent to the indoor unit 30, for example.

In the cooling mode, the outdoor heat exchanger 14 may operate as a condenser or as a gas cooler and may cool discharge-pressure working fluid received from the compressor 12 by transferring heat from the working fluid to air forced over the outdoor heat exchanger 14 by the outdoor blower 15, for example. The outdoor blower 15 could include a fixed-speed, multi-speed or variable-speed blower. In the cooling mode, the indoor heat exchanger 18 may operate as an evaporator in which the working fluid absorbs heat from air forced over the indoor heat exchanger 18 by the indoor blower 19 to cool a space within the home or building 32. The indoor blower 19 could include a fixed-speed, multi-speed or variable-speed blower. In the heating mode, the outdoor heat exchanger 14 may operate as an evaporator, and the indoor heat exchanger 18 may operate as a condenser or as a gas cooler and may transfer heat from working fluid discharged from the compressor 12 to a space to be heated.

Figure 2:
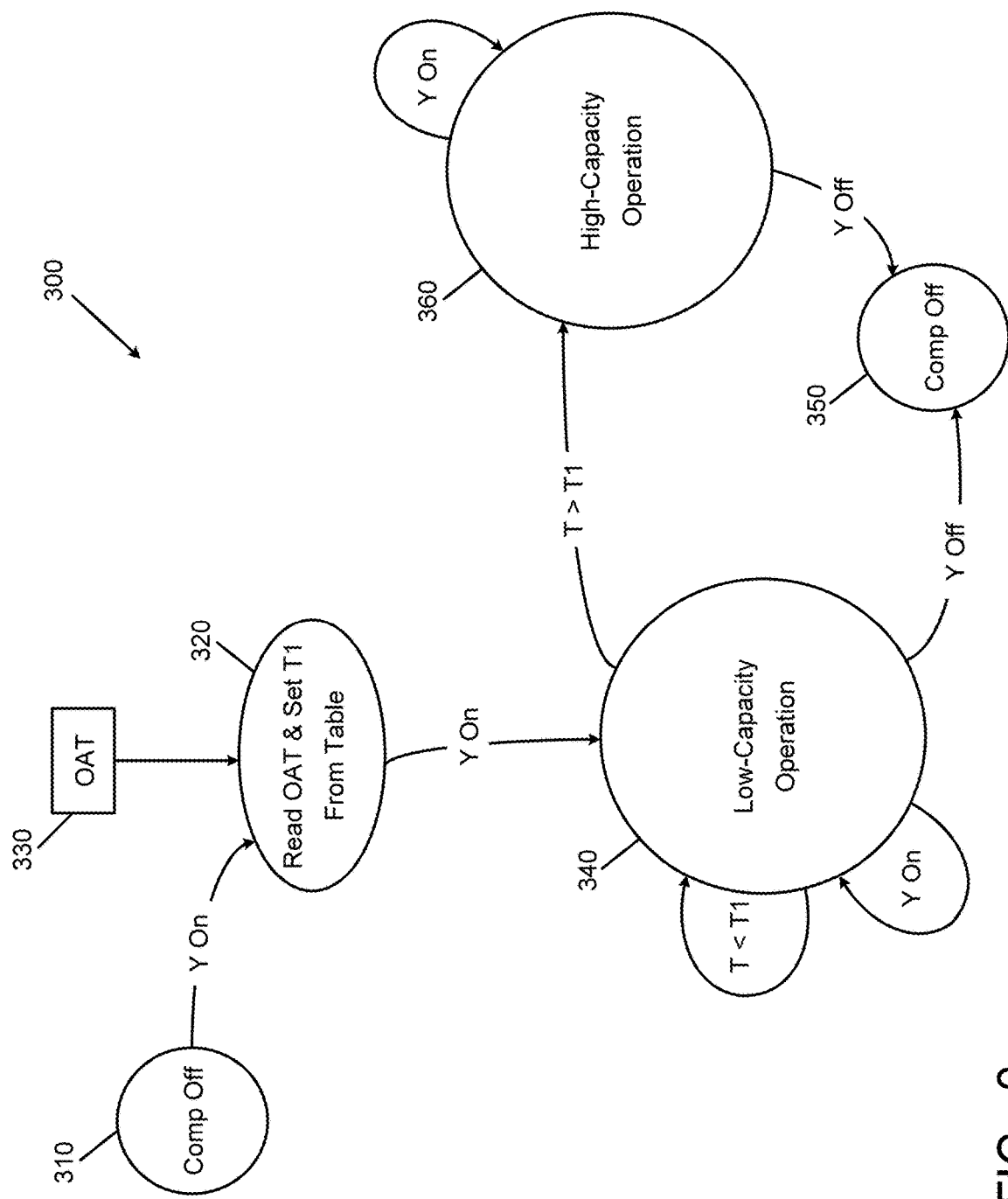
FIG. 2 is a state diagram illustrating another method and algorithm for controlling the variable-capacity compressor of FIG. 1.

Referring now to FIG. 2, a method and control algorithm 300 will be described that can be executed by the control module 22. The algorithm 300 may control operation of the compressor 12 and switch the compressor 12 between the low-capacity and high-capacity modes. In an initial state 310, the compressor 12 may be off. The thermostat 26 may send a demand signal Y to the control module 22 in response to an air temperature in the space to be heated or cooled by the system 10 dropping below (in the heating mode) or rising above (in the cooling mode) a selected setpoint temperature. In response to receipt of the demand signal Y, the control module 22 may initiate operation of the compressor 12 in the low-capacity mode (state 340) and simultaneously, at state 320, read an outdoor air temperature (received from sensor 24 at input 330) and set a low-capacity runtime T1 based on data from table 345 (FIG. 3). Thereafter, the compressor 12 may continue to run in the low-capacity mode until the cooling demand is satisfied (i.e., the temperature in the space to be cooled drops below the selected setpoint temperature as indicated by the thermostat 26 and the thermostat switches the demand signal Y to "off"), until the total runtime T of the compressor 12 since the receipt of the demand signal Y surpasses the low-capacity runtime T1 set at state 320, or until the compressor 12 or system 10 is manually shutdown or a diagnostic or protection algorithm overrides the algorithm 300.

If demand is satisfied before the total runtime T reaches the predetermined low-capacity runtime T1, the control module 22 may shutdown the compressor 12 (state 350). If the compressor 12 has been running for longer than the predetermined low-capacity runtime T1 without satisfying the demand, the control module 22 may switch the compressor 12 from the low-capacity mode to the high-capacity mode (state 360). The compressor 12 may continue to run in the high-capacity mode until the cooling demand is satisfied (or until the compressor 12 or system 10 is manually shutdown or a diagnostic or protection algorithm overrides the algorithm 100). When demand is satisfied, the control module 22 may shutdown the compressor 12 (state 350). When the compressor 12 is shut down after satisfying demand by operating in the high-capacity mode, the control module 22 may record the runtime T2 of the compressor 12 in the high-capacity mode and store the high-capacity runtime T2 in a memory module associated with the control module 22.

As described above, FIG. 3 depicts the table 345 from which the control module 22 determines the low-capacity runtime T1. First, the control module 22 determines from which row of the table 345 to read based on the outdoor ambient temperature (OAT) value received at input 330. That is, the row of the table 345 from which the control module 22 reads is the row having an OAT range that includes the OAT value received at input 330. If the control module 22 has not received a demand signal Y from the thermostat 26 in a relatively long predetermined period of time (e.g., days, weeks or longer), the control module 22 may initially set the low-capacity runtime T1 at a default or baseline value listed in the Baseline T1 column at the corresponding OAT row of table 345.

With the low-capacity runtime T1 set at the baseline value corresponding to the OAT at the time of the initiation of the demand signal Y, the control module 22 may cause the compressor 12 to run in the low-capacity mode (state 340) until demand is met or until the compressor runtime T surpasses the set low-capacity runtime T1. If demand has not been met when the runtime T reaches the set low-capacity runtime T1, the control module 22 may switch the compressor 12 to the high-capacity mode (state 360). The compressor 12 may continue operating in the high-capacity mode until demand is met. Once demand is met, the control module 22 may record in the high-capacity runtime T2, as described above.

Upon receipt of a subsequent demand signal Y, the control module 22 may again determine a low-capacity runtime value T1 from the table 345. This time, the control module 22 may determine if the OAT falls within one of a plurality of override ranges 347. For example, override ranges 347 in the cooling mode may include 85-90° F. and >90° F., and override ranges 347 in the heating mode may include 40-45° F. and <40° F. If the OAT value received at input 330 falls within one of the override ranges 347, the control module 22 may set the low-capacity runtime T1 at an override value determined by referencing the override T1 column at the corresponding OAT row.

The override value for the low-capacity runtime T1 may be determined based on a previous high-capacity runtime $T2_{n-1}$. For example, if the previous high-capacity runtime $T2_{n-1}$ is greater than a predetermined value (e.g., five minutes), the control module 22 may set the low-capacity runtime T1 to a first value (e.g., a short time period such as five seconds). If the previous high-capacity runtime $T2_{n-1}$ is less than the predetermined value (e.g., five minutes), the control module 22 may set the low-capacity runtime T1 to a second value (e.g., a longer time period such as twenty minutes or forty minutes). The control module 22 may then cause the compressor 12 to run in the low-capacity mode (state 340) until demand is met or until the compressor runtime T reaches the low-capacity runtime T1, at which time the control module 22 may switch the compressor to the high-capacity mode (state 360).

If the OAT falls within an OAT range that is not one of the override ranges 347, then the control module 22 will continue to set the low-capacity runtime T1 at the baseline value listed in the baseline T1 column. As described above, the control module 22 may cause the compressor 12 to run in the low-capacity mode until demand is met or until the compressor runtime T reaches the low-capacity runtime T1, at which time the control module 22 may switch the compressor 12 to the high-capacity mode until demand is met.

In another configuration, the algorithm 300 may include determining the low-capacity runtime T1 based on table 445 (FIG. 4) instead of table 345. As described above, the control module 22 may continuously or intermittently receive OAT data from the sensor 24 and may store the OAT data in a memory module. As described above, once the demand signal Y is received, the control module 22 may, at state 320, read the current OAT (from input 330) and set the low-capacity runtime T1 from the table 445.

If the control module 22 has not received a demand signal Y from the thermostat 26 in a relatively long predetermined period of time (e.g., days, weeks or longer), the control module 22 may initially set the low-capacity runtime T1 at a default or baseline value listed in Baseline T1 column 446 at the OAT row of table 445 that corresponds to the current OAT received at input 330. With the low-capacity runtime T1 set at the baseline value, the control module 22 may then cause the compressor 12 to operate in the low-capacity mode (state 340) until demand is met, or until the compressor runtime T reaches the set low-capacity runtime T1, at which time the control module 22 will run the compressor 12 in the high-capacity mode (state 360) until demand is met, in accordance with the algorithm 300 described above. The control module 22 may record the high-capacity runtime T2 for each run cycle of the compressor 12.

Upon receipt of a subsequent demand signal Y, the control module 22 may again determine a low-capacity runtime value T1 from the table 445. This time, the control module 22 may read the current OAT and determine a slope of the OAT over a predetermined time period (e.g., over the last twenty minutes, but may be any predetermined period of time that is suitably indicative of system conditions). If the OAT slope is within a neutral slope range (where the slope is greater than −0.3 degrees per 20 minutes and less than 0.3 degrees per 20 minutes, for example), then the control module 22 may set the low-capacity runtime T1 at the baseline value listed in the Baseline T1 column 446 at the OAT row of table 445 that corresponds to the current OAT. If the OAT slope is within a positive slope range (where the slope is greater than 0.3 degrees per 20 minutes, for example), then the control module 22 may set the low-capacity runtime T1 at the value listed in the Positive OAT Slope column 447 at the OAT row of table 445 that corresponds to the current OAT. If the OAT slope is within a first negative slope range (where the slope is less than −0.3 degrees per 20 minutes and greater than −0.6 degrees per 20 minutes, for example), then the control module 22 may set the low-capacity runtime T1 at the value listed in the Negative OAT Slope column 448 at the OAT row of table 445 that corresponds to the current OAT. If the OAT slope is within a second negative slope range (where the slope is less than −0.6 degrees per 20 minutes, for example), then the control module 22 may set the low-capacity runtime T1 at the value listed in the Extreme Negative OAT Slope column 449 at the OAT row of table 445 that corresponds to the current OAT.

While the OAT slope is described above as being determined over a predetermined time period, the OAT slope could also be determined by comparing OAT values at the beginning of a current compressor operating cycle (i.e., when the current demand signal Y is received) and at the end of the previous compressor operating cycle (i.e., when the last demand signal Y switched off). Still other methods for determining the OAT slope could be employed.

As shown in FIG. 4, some or all of the rows of column 447 and column 448 include steps for determining the low-capacity runtime T1 based on the previous high-capacity runtime $T2_{n-1}$ (i.e., the high-capacity runtime T2 of the previous run cycle in which the demand signal Y was constantly on or demand for heating or cooling was constantly present). For example, in the row of the Positive OAT Slope column 447 corresponding to an OAT of greater than 90° F.: if the previous high-capacity runtime $T2_{n-1}$ was greater than five minutes, then the current low-capacity runtime $T1_n$ should be set to five seconds; and if the previous high-capacity runtime $T2_{n-1}$ was less than or equal to five minutes, then the current low-capacity runtime $T1_n$ should be set to thirty minutes. As shown in FIG. 4, the above time and temperature values may vary for the various rows of columns 447 and 448.

Further, as shown in FIG. 4, the Extreme Negative OAT Slope column 449 may simply include predetermined values for each OAT range that may not be dependent upon a previous high-capacity runtime. In some configurations, the Extreme Negative OAT Slope column 449 may refer the algorithm to the Negative OAT Slope column 448 for colder OAT ranges (e.g., below 45° F.). For example, if the OAT slope is less than −0.6 degrees per 20 minutes and the current OAT is less than 45° F., the control module 22 may set the low-capacity runtime T1 in accordance with the Negative OAT Slope column 448.

After setting the low-capacity runtime T1 in accordance with table 445, the control module 22 may operate the compressor 12 in the low-capacity mode (state 340) until demand is met, or until the compressor runtime T reaches the set low-capacity runtime T1 (at which time the control module 22 will switch the compressor to the high-capacity mode until demand is met), in accordance with the algorithm 300 described above.

OAT slope is generally a good indicator or estimate of the time of day. Therefore, adjusting low-capacity and high-capacity runtimes based on OAT slope effectively adjusts low-capacity and high-capacity runtimes to account for the diurnal temperature profile. That is, during the course of a day, the OAT often changes according to a fairly standard profile. When the OAT is rising in the morning, the total compressor runtime T is typically shorter (during the cooling season) than when the OAT is falling in the evening because the house or building in which the system 10 is installed has accumulated a thermal load throughout the day that is still present in the evening. For the heating mode, the load shifts to early morning, i.e., more high-capacity runtime during positive slope periods or early morning part of day, and less low-capacity runtime during negative slope periods or evenings, since the house or building absorbs heat during the day. Therefore, adjusting the low-capacity and high-capacity runtimes based on OAT slope or time of day accounts for the thermal load on the house or building and increases comfort for the occupants.

Figure 5:
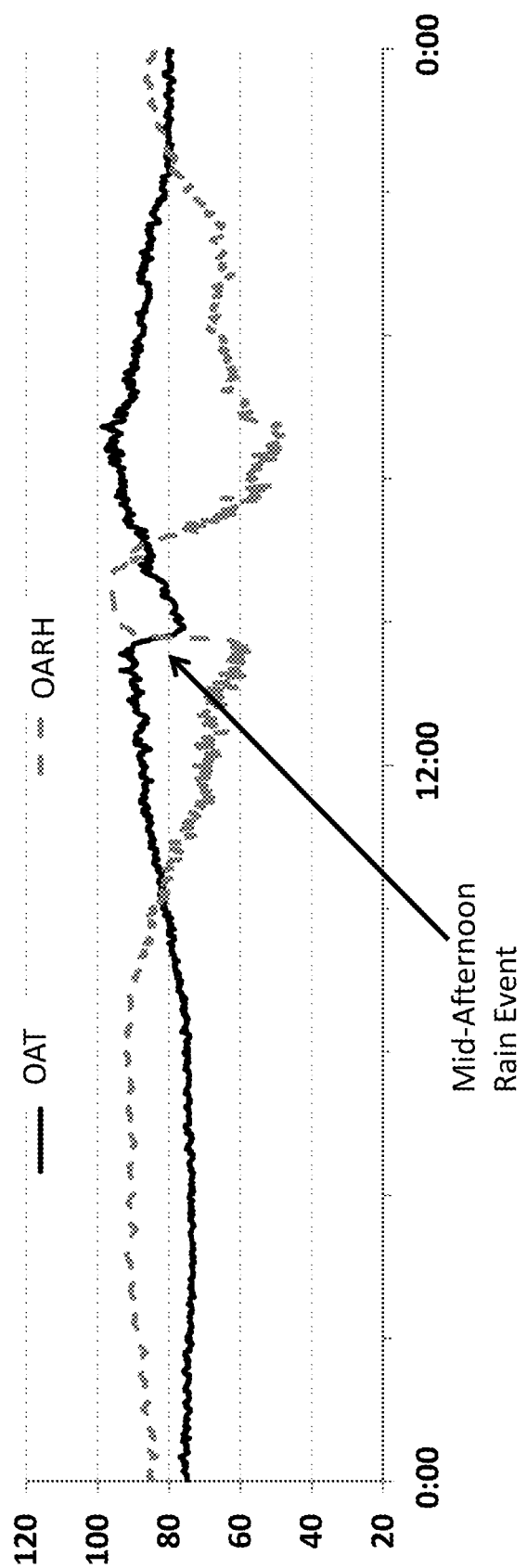
FIG. 5 is a graph depicting outdoor ambient temperature and outdoor ambient relative humidity versus time of day for an exemplary geographical location.

Furthermore, outdoor ambient relative humidity (OARH) often rises as OAT decreases and falls as OAT increases (as shown in FIG. 5). Therefore, OAT slope also indicates or approximates the slope of OARH. Thus, extreme negative OAT slopes (e.g., OAT slope less than −0.6 degrees per 20 minutes) can indicate an increased demand for dehumidification due to a mid-afternoon rain event, for example. Therefore, determining the OAT slope and adjusting low-capacity and high-capacity runtimes based on the OAT slope allows the algorithm 300 to account for the thermal load of the house or building and thermal load delay due to diurnal profile and allows the algorithm 300 to account for slope of ambient relative humidity without the use of a relative humidity sensor.

FIG. 5 depicts the OAT and OARH profile for a given day at a given location. As shown in FIG. 5, a mid-afternoon rain event can be accompanied by a sharp decrease in OAT and a corresponding sharp increase in OARH. Therefore, even though the OAT has decreased as a result of the rain event, demand for cooling may remain high due to the increased humidity and the possibility of OAT returning to its previous high before sunset. Therefore, such events having an extreme negative OAT slope are accounted for in table 445 (FIG. 4) at the Extreme Negative OAT Slope column 449, which assigns a very short low-capacity runtime T1 regardless of the length of any previous high-capacity runtime.

As described above, the indoor blower 19 (FIG. 1) could be a multi-speed blower that can be set at two or more speeds. Therefore, the system 10 may be operable in at least four different modes. In a first mode, the compressor 12 may operate in the low-capacity mode, and the indoor blower 19 may operate at a low speed. In a second mode, the compressor 12 may operate in the low-capacity mode, and the indoor blower 19 may operate at a high speed. In a third mode, the compressor 12 may operate in the high-capacity mode, and the indoor blower 19 may operate at the low speed. In a fourth mode, the compressor 12 may operate in the high-capacity mode, and the indoor blower 19 may operate at the high speed.

In some configurations, the speed of the indoor blower 19 may be set manually (e.g., by an installation contractor) and thereafter, the speed of the indoor blower 19 may be fixed at that speed. The speed of the indoor blower 19 could be selected based on the climate of the region (specifically, temperatures and humidity levels) in which the system 10 is installed. For example, as shown in FIG. 6, in regions with hot and humid climates (e.g., sub-tropical and tropical climates), the indoor blower 19 may be set to the low setting because lower indoor blower speeds are advantageous for faster dehumidification. In regions with very hot and dry climates (e.g., desert climates like the Southwest United States), the indoor blower 19 may be set to the high setting because higher indoor blower speeds are more advantageous for quickly reducing sensible heat. In regions with mixed temperatures and mild humidity, the indoor blower 19 may be set to the low or medium setting. In regions with mixed temperatures and higher humidity, the indoor blower 19 may be set to the low setting.

In the configurations in which the speed of the indoor blower 19 is set at installation and is fixed thereafter, the system 10 (having variable-capacity compressor 12) can be modulated between two modes: either between the first and third modes described above or between the second and fourth modes described above.

In other configurations, the control module 22 may be in communication with the indoor blower 19 and may be configured to modulate the speed of the indoor blower 19. In such configurations, the control module 22 may be configured to switch the system 10 among the first, second, third and fourth modes (i.e., by modulating the compressor 12 between the low-capacity and high-capacity modes and by modulating the indoor blower 19 between high and low speeds). The control module 22 may switch among the first, second, third and fourth modes depending on OAT, OAT slope, time of day, low-capacity and high-capacity runtimes T1, T2, indoor relative humidity, outdoor relative humidity, historical weather data and/or forecasted weather data, for example.

It will be appreciated that the tables 345 and 445 and runtimes T1, T2 could also be adjusted based on the climate of the region in which the system 10 is installed. FIGS. 7-10 provide overviews of the exemplary regions of FIG. 6 including low-capacity/high-capacity (Y1/Y2) compressor settings, OAT slopes, sensible loads and latent loads at various times of the day.

FIGS. 11-14 provide implementations of control modules that may choose between four modes of operation where the variable-capacity compressor 12 may operate in either low-capacity or high-capacity mode and an indoor blower 19 may operate at either a low speed or a high speed based on multiple environmental variables. These environmental variables include, but are not limited to: outdoor-air-temperature, outdoor-air-temperature slope, last cycle runtime, indoor temperature, indoor temperature slope, indoor relative humidity, indoor relative humidity slope, etc. As discussed above, and with reference to FIG. 16, the four modes may include: a first mode (mode 1), whereby the compressor 12 operates at low-capacity mode and the indoor blower 19 operates at low speed; a second mode (mode 2), whereby the compressor 12 operates at low-capacity and the indoor blower 19 operates at high speed; a third mode (mode 3), whereby the compressor 12 operates at high-capacity and the indoor blower 19 operates at low speed; and a fourth mode (mode 4), whereby the compressor 12 operates at high-capacity and the indoor blower 19 operates at high speed. As illustrated in FIG. 16, mode 1 is preferable and suited for medium sensible and latent cooling loads. Mode 2 is preferable and suited for very high sensible cooling loads. Mode 3 is preferable and suited for maximum dehumidification. Mode 4 is preferable and suited for maximum sensible cooling loads.

Figure 11:
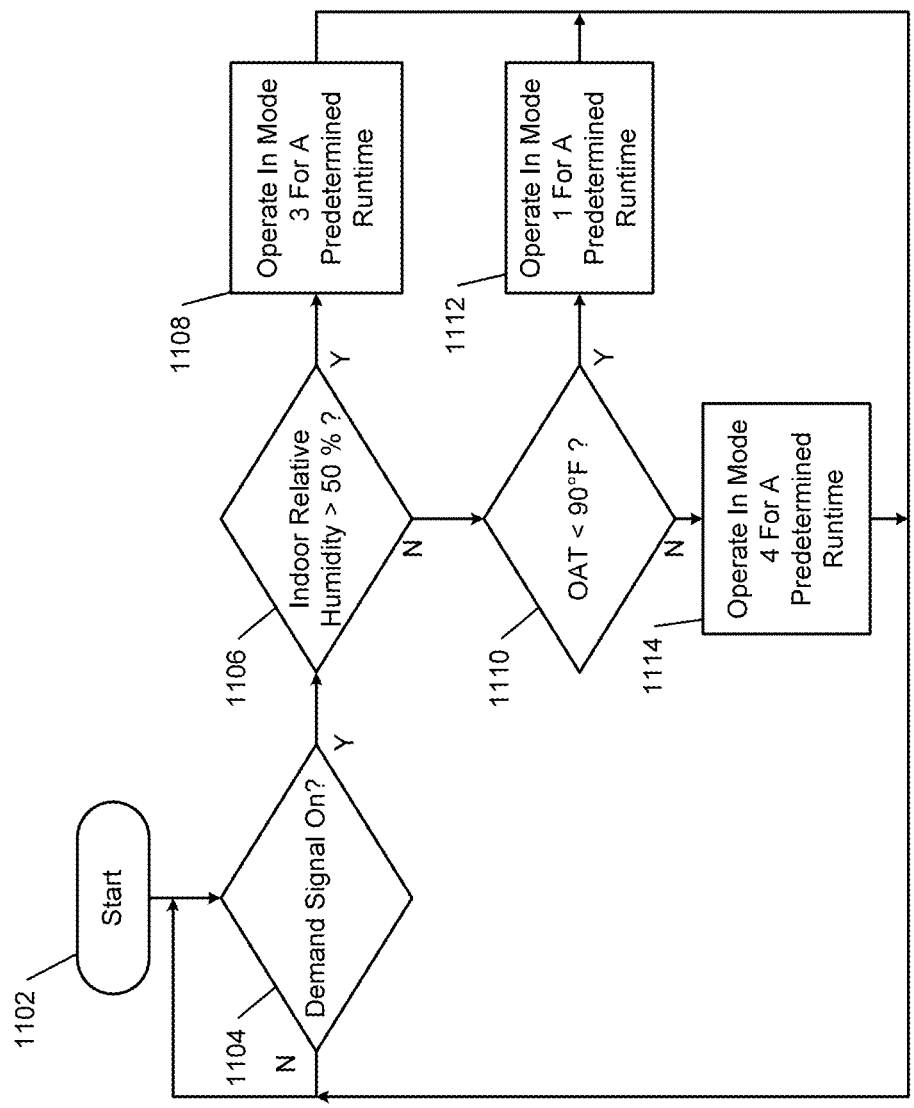
FIG. 11 is a flow chart illustrating an implementation of a method and algorithm for controlling the variable-capacity compressor and the variable-speed indoor blower including three modes.

In FIG. 11, a flow chart illustrates a method and algorithm for controlling the compressor 12 and the indoor blower 19 to operate in one of three operating modes to provide effective and comfortable cooling. The method and algorithm can be executed by the control module 22 and begins at 1102. At 1104 the control module 22 determines whether a demand signal is on. The demand signal is based on information provided by a thermostat 26 that is configured to measure an air temperature. The thermostat 26 also has a setpoint temperature input, which is the desired temperature of the area. The demand signal is on when the air temperature increases or decreases beyond the setpoint temperature. For example, the thermostat 26 can compare the measured air temperature with the setpoint temperature and generate the demand signal, which is received by the control module 22, based on the comparison.

The control module 22 loops back to 1104 until a demand signal is received. Once the demand signal is received, the control module 22 proceeds to 1106 and determines whether the indoor relative humidity exceeds a predetermined threshold, e.g., 50%. For example, the control module 22 may receive indoor relative humidity data from an indoor relative humidity sensor. For further example, the thermostat 26 may include both an indoor temperature sensor and an indoor relative humidity sensor and may provide data indicating the indoor temperature and/or the indoor relative humidity to the control module 22. Alternatively, the control module 22 may communicate with an indoor relative humidity sensor that is separate from the thermostat 26. At 1106, when the indoor relative humidity exceeds the predetermined threshold (e.g., 50%), the control module 22 continues to 1108 to operate the compressor 12 and indoor blower 19 in Mode 3, i.e., the compressor 12 is operated at high capacity and the indoor blower 19 is operated at low speed, for a predetermined runtime. For example, the predetermined runtime may be ten minutes. As shown, the system may operate in Mode 3 when the indoor relative humidity is greater than the predetermined threshold (50%).

As mentioned above, in Mode 3 or the third mode, the compressor 12 operates in the high-capacity mode and the indoor blower 19 operates at the low speed. Operating in the highest latent capacity (compressor in high-capacity mode) lowers the indoor relative humidity for occupant comfort and the lower sensible capacity (indoor blower at low speed) delays the air temperature from meeting the setpoint temperature resulting in longer runtime to meet the thermostat demand while allowing dehumidification of the space. Therefore, Mode 3 can provide maximum dehumidification and is optimal for hot and humid regions, such as, for example, the southeast region of the United States.

At 1106, when the indoor relative humidity does not exceed the predetermined threshold (e.g., 50%), the control module 22 proceeds to 1110 and determines whether an outdoor-air-temperature is less than a predetermined amount, e.g., 90° Fahrenheit (F). When the outdoor-air-temperature is below the predetermined amount (90° F.), the control module proceeds to 1112 and operates in Mode 1 for a predetermined runtime. For example, the predetermined runtime may be ten minutes. Therefore, the system may operate in Mode 1 when the indoor relative humidity is less than the predetermined threshold (e.g., 50%) and the outdoor-air-temperature is less than the predetermined amount (e.g., 90° F.).

As mentioned above, in Mode 1 or the first mode, the compressor 12 may operate in the low-capacity mode, and the indoor blower 19 may operate at the low speed. Operating the compressor in the low-capacity mode saves energy and the low indoor blower speed allows for better dehumidification compared to a high indoor blower speed. As such, Mode 1 is the better mode for energy savings and is optimal during medium sensible and medium latent loads.

At 1110, when the outdoor-air-temperature exceeds the predetermined amount (e.g., 90° F.), the control module proceeds to 1114 to operate in Mode 4 for a predetermined runtime. For example, the predetermined runtime may be ten minutes. Therefore, the system may operate in Mode 4 when the indoor relative humidity is less than the predetermined threshold (e.g., 50%) and the outdoor-air-temperature is greater than the predetermined amount (e.g., 90° F.).

As mentioned above, in Mode 4 or the fourth mode, the compressor 12 may operate in the high-capacity mode, and the indoor blower 19 may operate at the high speed. Operating the compressor in the high-capacity mode and the indoor blower at the high speed provides low dehumidification capacity; however, this combination is better for sensible cooling. Therefore, Mode 4 is optimal for hot dry regions, such as the southwest region of the United States.

In any mode, as discussed above, the compressor 12 and the indoor blower 19 may operate for a period runtime, which may be static, e.g., ten minutes, or dynamic, depending on any environmental variables mentioned above. After operating in any mode for a period of time, the control module 22 returns to 1104 to determine if the demand is still on, i.e., if the air temperature matches the setpoint temperature, satisfying the demand. If the demand has been met, the control module 22 may deactivate the compressor 12 and/or the indoor blower 19 and then loop back to 1104 until another demand signal is on. Alternatively, depending on the user's configuration the indoor blower 19 may run constantly and the control module 22 may simply deactivate the compressor 12 when the demand has been met. If the demand is not met 1104, control continues through the flow chart again, allowing the system to run in the same or a different mode depending on potential changes in environmental variables.

In an alternative implementation, instead of determining whether the indoor relative humidity is greater than the predetermined threshold (50%) at 1106, the system could use an indoor relative humidity slope variable. For example, at 1106 the control module 22 could determine whether the indoor relative humidity slope is increasing at a predetermined rate. When the indoor relative humidity slope is increasing at the predetermined rate, the control module 22 may then operate the system in Mode 3, i.e., with the compressor 12 at high capacity and the indoor blower 19 at low speed.

Figure 12:
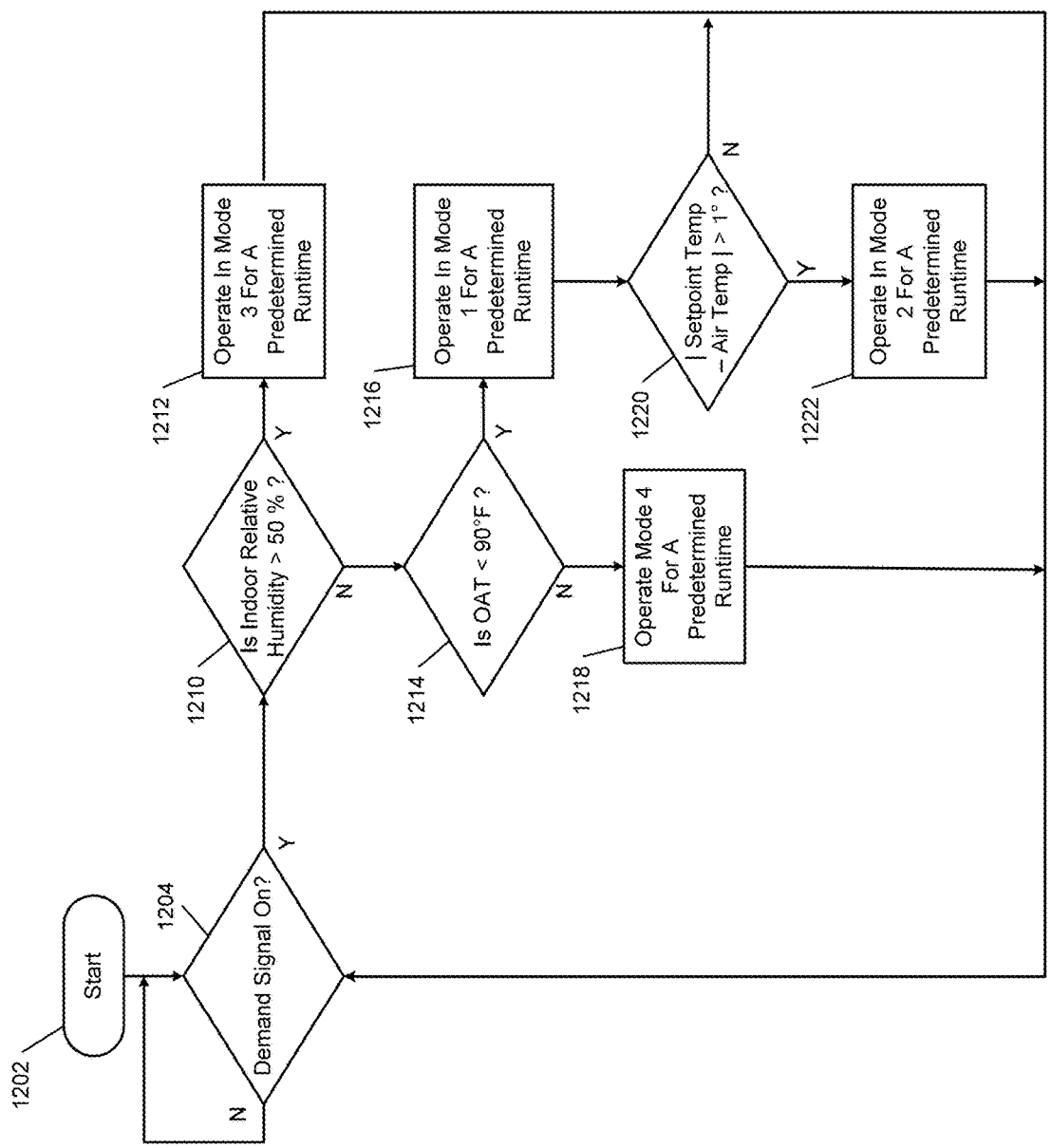
FIG. 12 is a flow chart illustrating an implementation of a method and algorithm for controlling the variable-capacity compressor and the variable-speed indoor blower including four modes.

In FIG. 12, a flow chart illustrates a method and algorithm for controlling the compressor 12 and the indoor blower 19 to operate in one of four operating modes to provide effective and comfortable cooling. The method and algorithm can be executed by the control module 22 and begins at 1202. At 1204, the control module 22 determines whether the demand signal is on, as previously described. The control module 22 loops back to 1204 until the demand signal is on.

At 1204, when the demand signal is on, the control module 22 proceeds to 1210. At 1210, the control module 22 determines whether the indoor relative humidity is greater than the predetermined threshold (e.g., 50%). If so, the control module proceeds to 1212 and operates the system in Mode 3 for a predetermined runtime, e.g., ten minutes. However, if at 1210 the indoor relative humidity is less than the predetermined threshold (e.g., 50%), the control module 22 continues to 1214 and determines whether the outdoor-air-temperature is less than the predetermined amount (e.g., 90° F.).

At 1214, when the outdoor-air-temperature is less than the predetermined amount (e.g., 90° F.), the control module 22 proceeds to 1216 and operates the system in Mode 1 for a predetermined runtime, e.g., ten minutes. At 1214, when the outdoor-air-temperature is greater than the predetermined amount (e.g., 90° F.), the control module 22 proceeds to 1218 and operates the system in Mode 4 for a predetermined runtime, such as ten minutes.

At 1216, after operating in mode 1 for a predetermined runtime, such as ten minutes, the control module 22 proceeds to 1220 and determines whether the absolute value of the difference between the setpoint temperature and the air temperature (e.g., indoor temperature) is greater than a predetermined incremental value, e.g., 1° F. If not, then the air temperature almost matches the setpoint temperature, and the demand signal is almost satisfied. In such case, the control module 22 continues to 1204 and proceeds through the flowchart again, provided that the demand signal remains on at step 1204. At 1220, when the absolute value of the different between the setpoint temperature and the air temperature (e.g., indoor temperature) is greater than a predetermined incremental value, e.g., 1° F., the control module 22 proceeds to 1222 and operates the system in Mode 2, i.e., with the compressor 12 at low capacity and the indoor blower 19 at high speed for a predetermined runtime, e.g., ten minutes. Therefore, the system may operate in Mode 2, after operating in mode 1, when the air temperature is within the incremental value (1° F.) of the setpoint temperature.

As mentioned previously, in Mode 2 or the second mode, the compressor 12 may operate in the high-capacity mode, and the indoor blower 19 may operate at the low speed. Operating in Mode 2 provides for sensible or temperature cooling. Mode 2 prolongs the amount of time to reach the setpoint temperature and is good for air circulation. Mode 2 is used to increase the system runtime, which may offer additional comfort while the system approaches the setpoint temperature.

After operation in any of the modes, the control module 22 returns to 1204 to determine whether the demand signal is still on, i.e., if the demand has been satisfied. When the demand signal is off, the demand has been met and the control module 22 may deactivate the compressor 12 and/or the indoor blower 19 and then loops back to 1204 until the demand signal is on again. Alternatively, depending on the user's configuration the indoor blower 19 may run constantly and the control module 22 may simply deactivate the compressor 12 when the demand has been met. If the demand is still on, the control module 22 continues through the flow chart again, allowing the system to run in the same mode or a different mode depending on any potential changes in the environmental variables.

As discussed above with respect to FIG. 11, in an alternative implementation, instead of determining whether the indoor relative humidity is greater than the predetermined threshold (e.g., 50%) at 1210, the control module 22 could instead determine an indoor relative humidity slope variable. For example, the control module 22 at 1210 could determine whether the indoor relative humidity slope is increasing at a predetermined rate. When the indoor relative humidity slope is increasing at the predetermined rate, the control module 22 may then proceed to 1212 to operate the system in Mode 3. When the indoor relative humidity slope is not increasing at the predetermined rate, the control module 22 may then proceed to 1214, 1216, and 1218 and operate the system in either Mode 1 or Mode 3, depending on the outdoor-ambient temperature.

Figure 13:
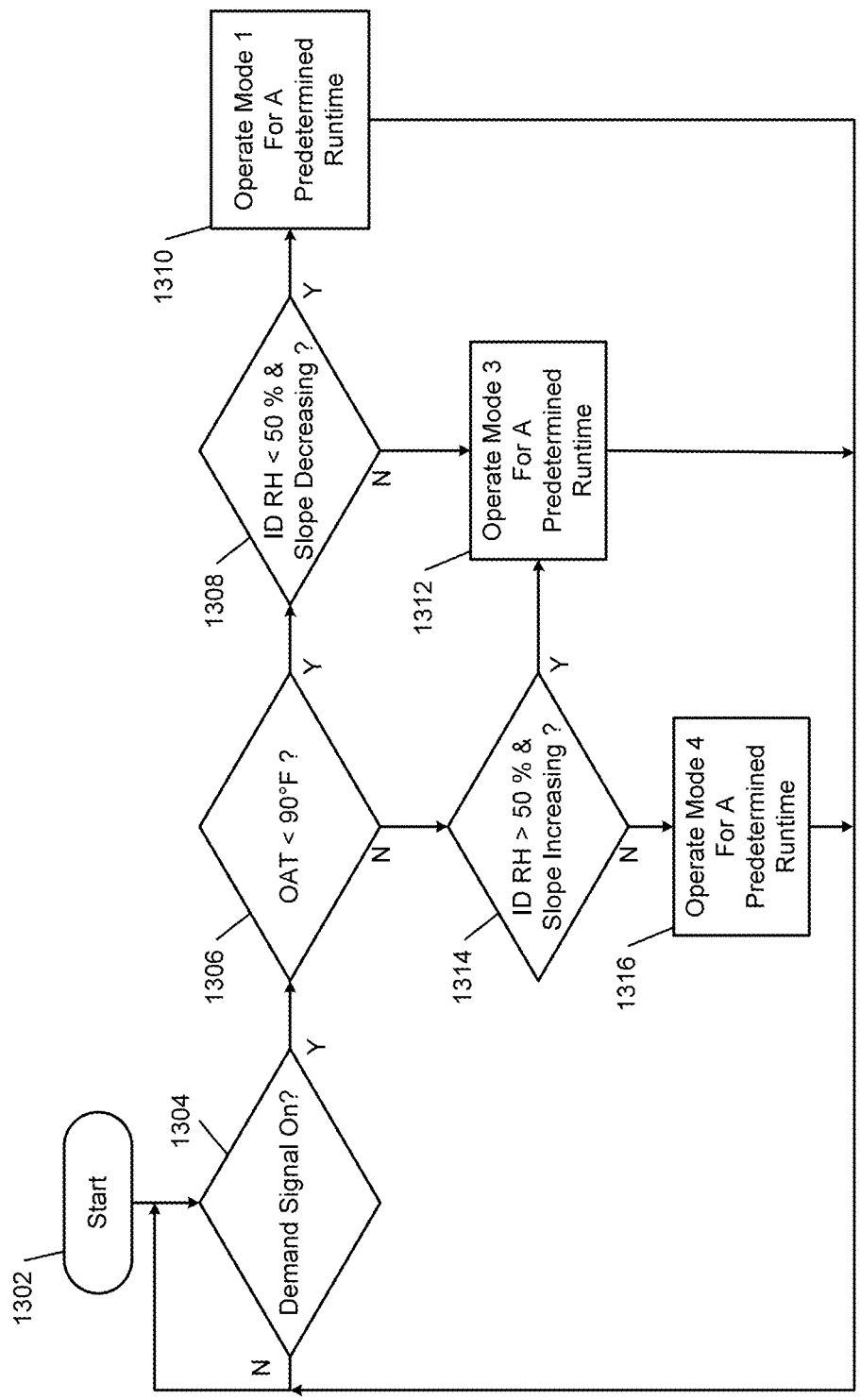
FIG. 13 is a flow chart illustrating another implementation of a method and algorithm for controlling the variable-capacity compressor and the variable-speed indoor blower including three modes.

In FIG. 13, a flow chart illustrates a method and algorithm for controlling the compressor 12 and the indoor blower to operate in one of three operating modes to provide effective and comfortable cooling, accounting for the outdoor-air-temperature, indoor relative humidity, and the indoor relative humidity slope. The method and algorithm can be executed by the control module 22 and begins at 1302. At 1304, the control module 22 determines whether the demand signal is on, as previously described, and loops back to 1304 until the demand signal is on. Once the demand signal is on, the control module 22 continues to 1306 and determines whether the outdoor-air-temperature is less than the predetermined amount (e.g., 90° F.). If so, the control module 22 proceeds to 1308 and determines whether the indoor relative humidity is less than the predetermined threshold (e.g., 50%) and the indoor relative humidity slope is decreasing at a predetermined rate.

At 1308, the control module 22 continues to 1310 to operate in Mode 1 for a predetermined runtime, such as ten minutes, when the indoor relative humidity is less than the predetermined threshold (e.g., 50%) and the indoor relative humidity slope is decreasing at the predetermined rate. Therefore, the system may operate in Mode 1 when the outdoor-air-temperature is less than the predetermined amount (e.g., 90° F.), the indoor relative humidity is less than the predetermined threshold (e.g., 50%), and the indoor relative humidity slope is decreasing at a predetermined rate.

At 1308, when the indoor relative humidity is not less than the predetermined threshold (e.g., 50%) or the indoor relative humidity slope is not decreasing at the predetermined rate, the control module 22 continues to 1312 and operates the system in Mode 3 for a predetermined runtime, such as ten minutes.

Additionally, when the control module 22 determines at 1306 that the outdoor-air-temperature is greater than the predetermined amount (e.g., 90° F.), the control module 22 continues to 1314 to determine whether the indoor relative humidity is greater than the predetermined threshold (e.g., 50%) and whether the indoor relative humidity slope is increasing at a predetermined rate. If those conditions are met, the control module 22 proceeds to 1312 to operate in Mode 3 for a predetermined runtime, such as ten minutes. Therefore, the system operates in Mode 3, for example, when (i) the outdoor-air-temperature is less than the predetermined amount (e.g., 90° F.) and the indoor relative humidity is greater than the predetermined threshold (e.g., 50%); (ii) the outdoor-air-temperature is less than the predetermined amount (e.g., 90° F.), the indoor relative humidity is less than the predetermined threshold (e.g., 50%), and the indoor relative humidity slope is not decreasing at the predetermined rate; and (iii) the outdoor-air-temperature is greater than the predetermined amount (e.g., 90° F.), the indoor relative humidity is greater than the predetermined threshold (e.g., 50%), and the indoor relative humidity slope is increasing at the predetermined rate.

However, when at 1314 the control module 22 determines that indoor relative humidity is not greater than the predetermined threshold (e.g., 50%) or that the indoor relative humidity slope is not increasing at the predetermined rate, the control module 22 continues to 1316 and operates the system in Mode 4 for a predetermined runtime, such as ten minutes. Therefore, the system operates in Mode 4 when the outdoor-air-temperature is greater than the predetermined amount (e.g., 90° F.) and either (i) the indoor relative humidity slope is not increasing at the predetermined rate; or (ii) the indoor relative humidity is less than the predetermined threshold (e.g., 50%).

After operating in any of the modes, the control module 22 determines whether the demand signal is still on at 1304, as discussed above with respect to FIGS. 11 and 12.

Figure 14:
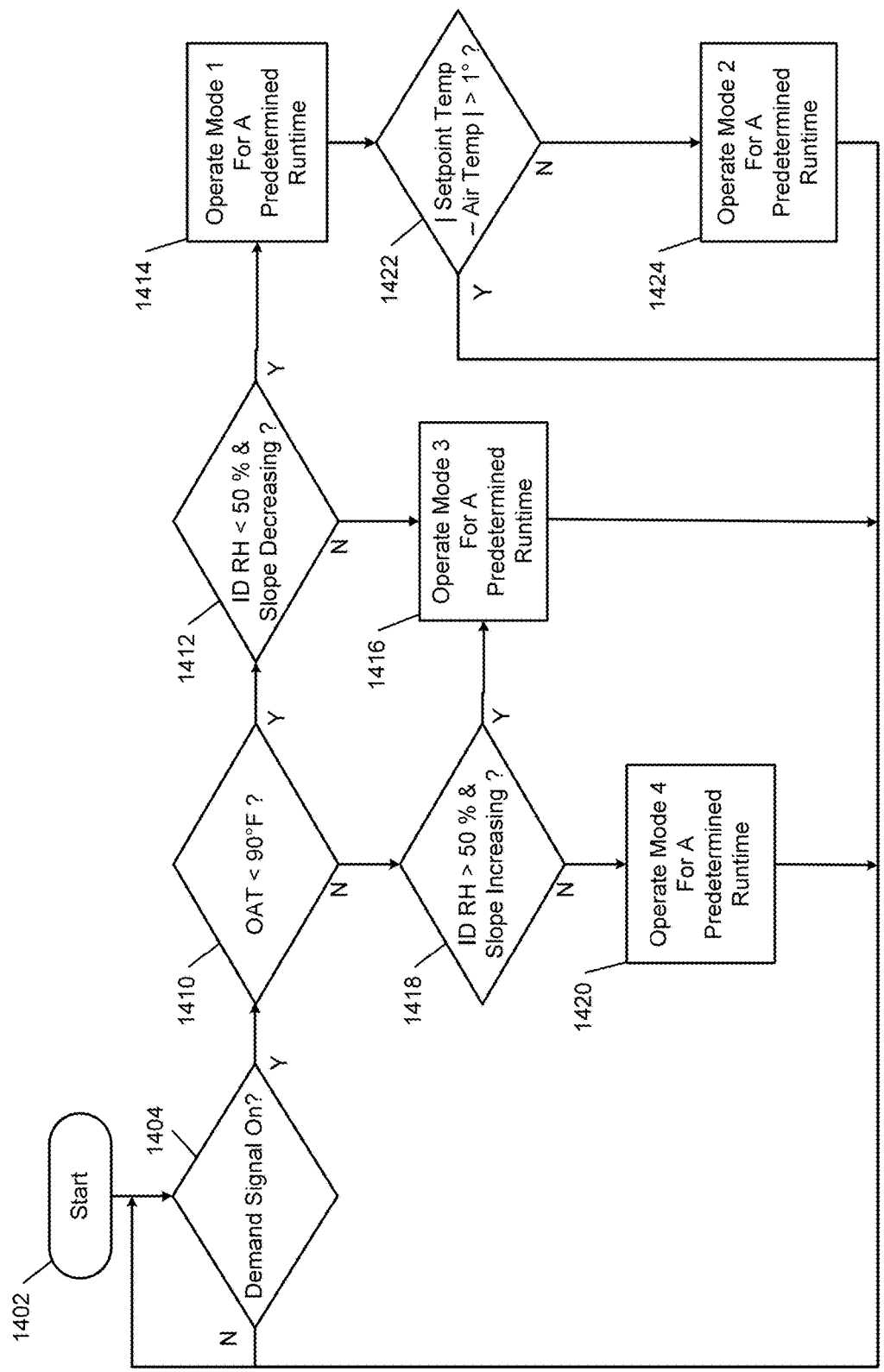
FIG. 14 is a flow chart illustrating another implementation of a method and algorithm for controlling the variable-capacity compressor and the variable-speed indoor blower including four modes.

In FIG. 14, a flow chart illustrates a method and algorithm for controlling the compressor 12 and the indoor blower to operate in one of four operating modes to provide effective and comfortable cooling, accounting for the outdoor-air-temperature, indoor relative humidity, and the indoor relative humidity slope. The method and algorithm can be executed by the control module 22 and begins at 1402. At 1404, the control module 22 determines whether the demand signal is on and if it is not, loops back to 1404 until the demand signal is on. Once the demand signal is on, the control module 22 continues to 1410 to determine whether the outdoor-air-temperature is less than the predetermined amount (e.g., 90° F.). If so, the control module 22 proceeds to 1412 and determines whether the indoor relative humidity is less than the predetermined threshold (e.g., 50%) and whether the indoor relative humidity slope is decreasing at a predetermined rate.

At 1412, when the indoor relative humidity is less than the predetermined threshold (e.g., 50%) and the indoor relative humidity slope is decreasing at a predetermined rate, the control module continues to 1414 to operate the system in Mode 1 for a predetermined runtime, such as ten minutes. Therefore, the system may operate in Mode 1 when the outdoor-air-temperature is less than the predetermined amount (e.g., 90° F.), the indoor relative humidity is less than the predetermined threshold (50%), and the indoor relative humidity slope is decreasing at a predetermined rate.

At 1412, when the indoor relative humidity is not less than the predetermined threshold (e.g., 50%) or the indoor relative humidity slope is not decreasing at the predetermined rate, the control module 22 proceeds to 1416 to operate the system in Mode 3 for a predetermined runtime, such as ten minutes. Additionally, at 1410, when the control module 22 determines that the outdoor-air-temperature is greater than the predetermined amount (e.g., 90° F.), the control module 22 continues to 1418 to determine whether the indoor relative humidity is greater than the predetermined threshold (e.g., 50%) and whether the indoor relative humidity slope is increasing at a predetermined rate. At 1418, when those conditions are met, the control module 22 continues to 1416 to operate in Mode 3 for a predetermined time period, such as ten minutes, as well. Therefore, the system operates in Mode 3, for example, when (i) the outdoor-air-temperature is less than the predetermined amount (e.g., 90° F.) and the indoor relative humidity is greater than the predetermined threshold (50%); (ii) the outdoor-air-temperature is less than the predetermined amount (90° F.), the indoor relative humidity is less than the predetermined threshold (50%), and the indoor relative humidity slope is not decreasing at the predetermined rate; and (iii) the outdoor-air-temperature is greater than the predetermined amount (e.g., 90° F.), the indoor relative humidity is greater than the predetermined threshold (e.g., 50%), and the indoor relative humidity slope is increasing at the predetermined rate.

At 1418, when the control module 22 determines that indoor relative humidity is not greater than the predetermined threshold (e.g., 50%) or that the indoor relative humidity slope is not increasing at the predetermined rate, the control module 22 proceeds to 1420 to operate in Mode 4 for a predetermined time period, such as ten minutes. Therefore, the system operates in Mode 4, for example, when the outdoor-air-temperature is greater than the predetermined amount (e.g., 90° F.) and (i) the indoor relative humidity slope is decreasing at the predetermined rate; or (ii) the indoor relative humidity is less than the predetermined threshold (50%) and the indoor relative humidity slope is increasing at the predetermined rate.

At 1414, after operating in mode 1 for the predetermined runtime, such as ten minutes, the control module 22 proceeds to 1422 and determines whether the absolute value of the difference between the setpoint temperature and the indoor air temperature is greater than an incremental value (e.g., 1° F.). If not, i.e., the indoor air temperature is within the incremental value (1° F.) of the setpoint temperature, then the control module 22 loops back to 1404 and starts the flowchart over again, provided that the demand signal is still on. At 1422, when the absolute value of the difference between the setpoint temperature and the indoor air temperature is not greater than the incremental value (e.g., 1° F.), the control module 22 continues to 1424 to operate in Mode 2 for a predetermined runtime, such as ten minutes, i.e., with the compressor 12 operating at low capacity and the indoor blower 19 operating at high speed.

After operating in any of the modes, the control module 22 determines whether the demand signal is still on, as discussed above with respect to FIGS. 11 and 12.

In alternative implementations, the operation modes may be chosen based on regional settings along with environmental variables such as indoor relative humidity and outdoor-air-temperature. FIG. 15 is a table showing initial operational modes for the system based on regional data, more specifically the outdoor relative humidity and the outdoor temperature. In the first row, Mode 1 is assigned to a region with low humidity and low temperature. FIG. 15 further illustrates that after operating in the initial mode based on regional data, the system could consider the indoor relative humidity and the outdoor-air-temperature to determine whether to switch to a different mode as the environmental variables may have changed. For example, after running Mode 1, the system would switch to Mode 3 if the indoor relative humidity exceeds 50%. If after running Mode 1, the indoor relative humidity is below 50% but the outdoor-air-temperature is above 90° F., then the system would switch to Mode 4.

In the second row, Mode 4 is assigned to a region with low humidity and high temperature. After operating in the initial mode based on regional data, the system could account for the indoor relative humidity and the outdoor-air-temperature to determine whether to switch to a different mode as the environment variables may have changed. For example, after running Mode 4, the system would switch to Mode 3 if the indoor relative humidity exceeds 50%. If after running Mode 4, the indoor relative humidity is below 50% and the outdoor-air-temperature is below 80° F., then the system would switch to Mode 1.

In the second row, Mode 3 is assigned to a region with high humidity. After operating in the initial mode based on regional data, the system could account for the indoor relative humidity and the outdoor-air-temperature to determine whether to switch to a different mode as the environment variables may have changed. For example, after running Mode 3, the system could switch to Mode 4 if the indoor relative humidity is below 50% and the outdoor-air-temperature is above 90° F. If after running Mode 3, the indoor relative humidity is below 50% and the outdoor-air-temperature is below 90° F., then the system could switch to Mode 1.

Figure 17:
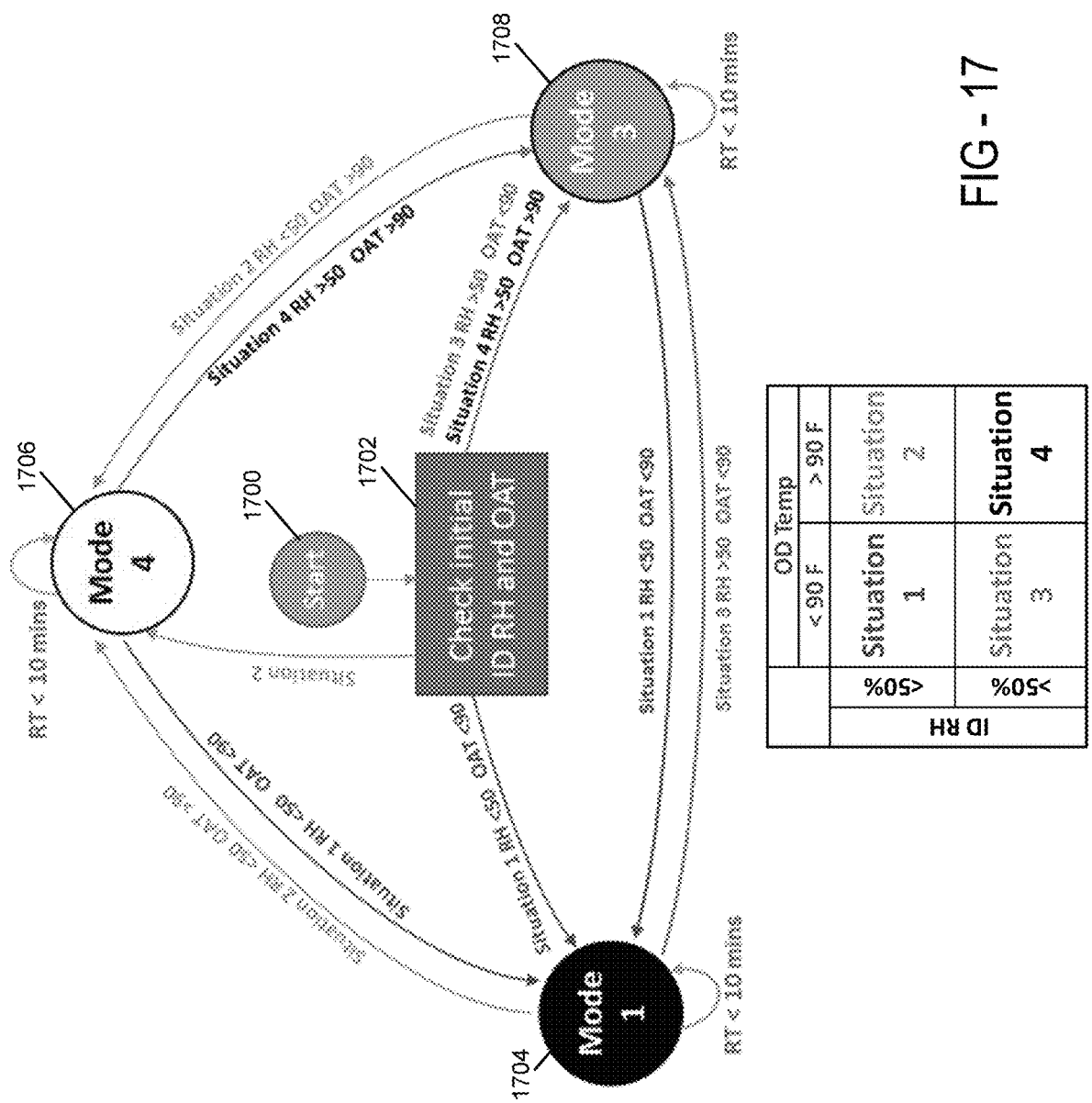
FIG. 17 is a state diagram illustrating another method and algorithm for controlling the variable-capacity compressor and the variable-speed indoor blower.

Referring now to FIG. 17, a method and control algorithm will be described that can be executed by the control module 22. The algorithm may control operation of the compressor 12 and the indoor blower 19 and switch the compressor 12 between the low-capacity and high-capacity modes and the indoor blower 19 between the low-speed and high-speed modes. In this way, as shown in FIG. 17, the control module 22 may switch the system between modes 1, 3, and 4. The control module 22 starts at 1700 and proceeds to state 1702 once a demand signal is received. At 1702, the control module 22 checks the initial indoor relative humidity (RH), as received, for example, from the thermostat, and checks the outdoor air temperature (OAT). At 1702, the control module 22 then checks to see whether Situation 1, 2, 3, or 4 applies. For example, situation 1 corresponds to the RH being less than 50% and the OAT being less than 90° F. Situation 2 corresponds to the RH being less than 50% and the OAT being greater than 90° F. Situation 3 corresponds to the RH being greater than 50% and the OAT being less than 90° F. Situation 4 corresponds to the RH being greater than 50% and the OAT being greater than 90° F.

At 1702, when situation 1 applies, the control module 22 proceeds to operate the system in mode 1 at state 1704. At 1702, when situation 2 applies, the control module 22 proceeds to operate the system in mode 4 at state 1706. At 1702, when situations 3 or 4 apply, the control module 22 proceeds to operate the system in mode 3 at state 1708. In each of the modes, the control module 22 continues to operate the system in the corresponding modes at each of the states 1704, 1706, and 1708 for a predetermined runtime, such as ten minutes.

After operating the system for the predetermined runtime, the control module 22 checks the RH and OAT to determine whether it should switch operating modes.

For example, when operating in mode 1 at state 1704, the control module determines whether situation 2 or situation 3 applies. At 1704, when situation 2 applies, the control module proceeds to state 1706 to operate the system in mode 4. At 1704, when situation 3 applies, the control module proceeds to state 1706 to operate the system in mode 3. When operating in mode 4 at state 1706, the control module 22 determines whether situation 1 or situation 4 applies. At 1706, when situation 1 applies, the control module 22 proceeds to state 1704 and operates the system in mode 1. At 1706, when situation 4 applies, the control module 22 proceeds to state 1706 and operates the system in mode 3. At 1708, the control module 22 determines whether situation 1 or situation 2 applies. At 1708, when situation 2 applies, the control module 22 proceeds to state 1706 and operates the system in mode 4. At 1708, when situation 1 applies, the control module 22 proceeds to state 1704 and operates the system in mode 1. In each case, once a new state is entered, the control module 22 continues to operate the system in that state for the predetermined runtime of, for example, ten minutes. The control module 22 continues to operate the system based on the control algorithm shown in FIG. 17 until the demand signal is withdrawn or deactivated. In such case, the control module 22 waits for a new demand signal to be received and starts the control algorithm again at step 1700.

In this way, as illustrated in FIG. 17, the control module 22 checks the initial RH and OAT and determines the operating mode, i.e., mode 1, mode 3, or mode 4. If the RH and/or OAT changes during the demand cycle, i.e., after a particular mode has been assigned, the system runs for at least the predetermined runtime, e.g., ten minutes, in the assigned mode before switching to another mode. The control module 22 can switch the system into a different operating mode in the same demand cycle one or more times. In other words, after switching to another mode after the predetermined runtime, such as ten minutes, the control module 22 may switch the system into a different operating mode and run in that operating mode for the predetermined runtime, such as ten minutes. The control module 22 may also, depending on the RH and OAT, stay in the same operating mode for the entire demand cycle.

Figure 18:
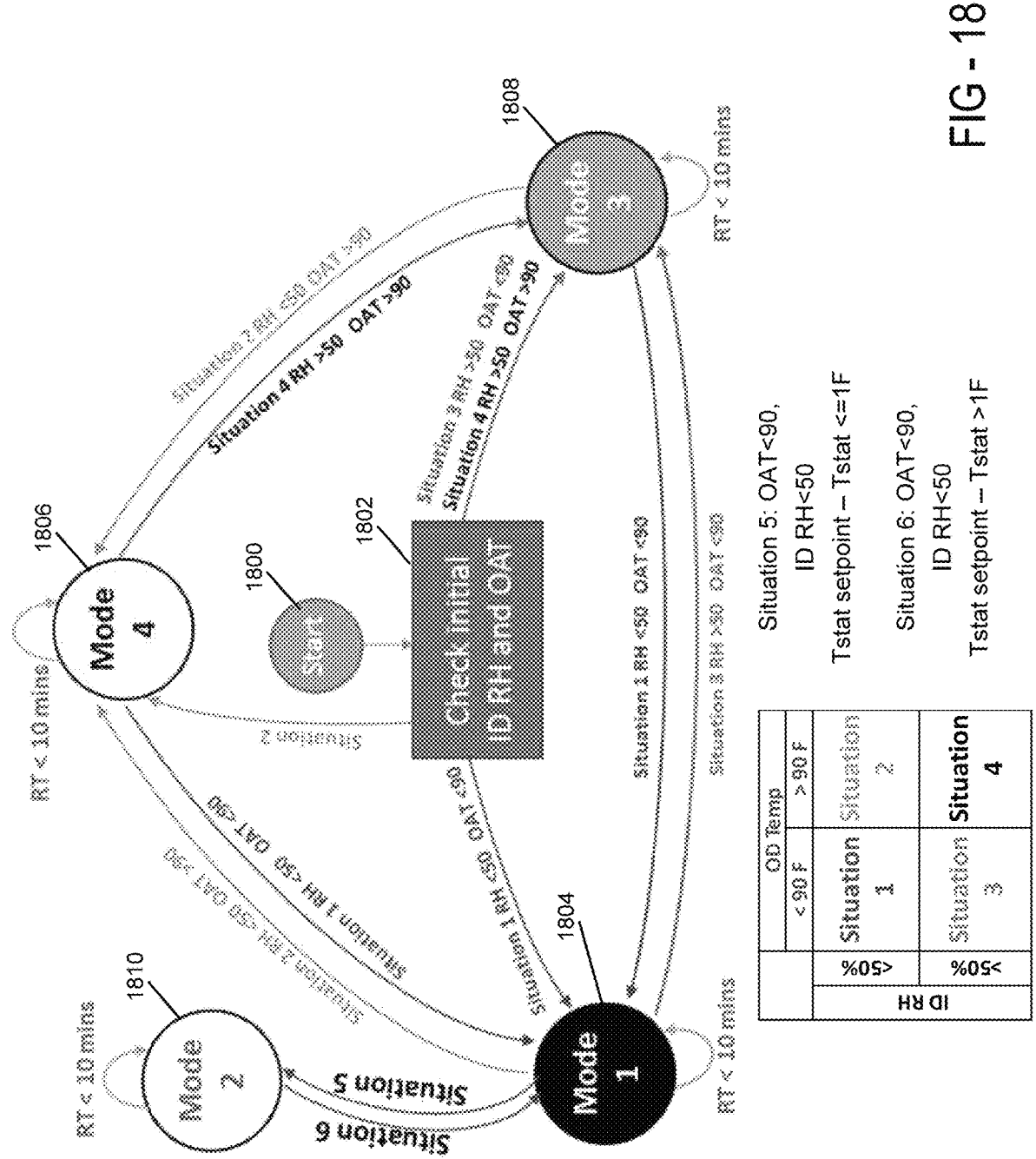
FIG. 18 is a state diagram illustrating another method and algorithm for controlling the variable-capacity compressor and the variable-speed indoor blower.

Referring now to FIG. 18, another method and control algorithm will be described that can be executed by the control module 22. The algorithm may control operation of the compressor 12 and the indoor blower 19 and switch the compressor 12 between the low-capacity and high-capacity modes and the indoor blower 19 between the low-speed and high-speed modes. In this way, as shown in FIG. 18, the control module 22 may switch the system between modes 1, 2, 3, and 4. As shown in FIG. 18, states 1800, 1802, 1804, 1806, and 1808 correspond to states 1700, 1702, 1704, 1706, and 1708, respectively, which are described in detail above with reference to FIG. 17.

However, in addition to the states described above with reference to FIG. 17, the control algorithm shown in FIG. 18 includes an additional state 1810 corresponding to operating the system in mode 2. For example, when the control module 22 is operating the system in mode 1 at state 1804, the control module 22 determines whether situation 5 applies. In situation 5, for example, the OAT is less than 90° F., the RH is less than 50%, and the $T_{stat\ setpoint}$ minus the $T_{stat}$ (i.e., indoor temperature) is less than or equal to 1° F. At state 1804, when situation 5 applies, the control module 22 proceeds to state 1810 and operates the system in mode 2 for a predetermined runtime, such as ten minutes. At state 1810, after operating the system in mode 2 for the predetermined runtime, such as ten minutes, the control module 22 determines whether situation 6 applies. Specifically, situation 6 applies when the OAT is less than 90° F., the RH is less than 50%, and the $T_{stat\ setpoint}$ minus the $T_{stat}$ (i.e., indoor temperature) is greater than 1° F. At state 1810, when situation 6 applies, the control module 22 proceeds to state 1804 and operates the system in mode 1. The control module 22 continues to operate the system based on the control algorithm shown in FIG. 18 until the demand signal is withdrawn or deactivated. In such case, the control module 22 waits for a new demand signal to be received and starts the control algorithm again at step 1800.

In this way, as illustrated in FIG. 18, the control module 22 checks the initial RH and OAT and determines the operating mode, i.e., mode 1, mode 3, or mode 4. If the RH and/or OAT changes during the demand cycle, i.e., after a particular mode has been assigned, the system runs for at least the predetermined runtime, e.g., ten minutes, in the assigned mode before switching to another mode. The control module 22 can switch the system into a different operating mode in the same demand cycle one or more times. In other words, after switching to another mode after the predetermined runtime, such as ten minutes, the control module 22 may switch the system into a different operating mode and run in that operating mode for the predetermined runtime, such as ten minutes. The control module 22 may also, depending on the RH and OAT, stay in the same operating mode for the entire demand cycle. In addition, as illustrated in FIG. 18, the control module 22 can use operating mode 2 to increase system run time, which may offer additional comfort by keeping the system running with the compressor 12 in the low-capacity mode and the indoor blower 19 at high speed when the system comes close to meeting the thermostat demand or load. In other words, as the system comes close to meeting the demand or lose, the control module 22 switches the system to mode 2 and after the predetermined runtime, such as ten minutes, if the load has not been met and the indoor temperature is more than a predetermined amount, such as 1° F., away from the thermostat setpoint, the control module 22 switches the system back to operating mode 1 to operate for the predetermined runtime, such as ten minutes.

Figure 19:
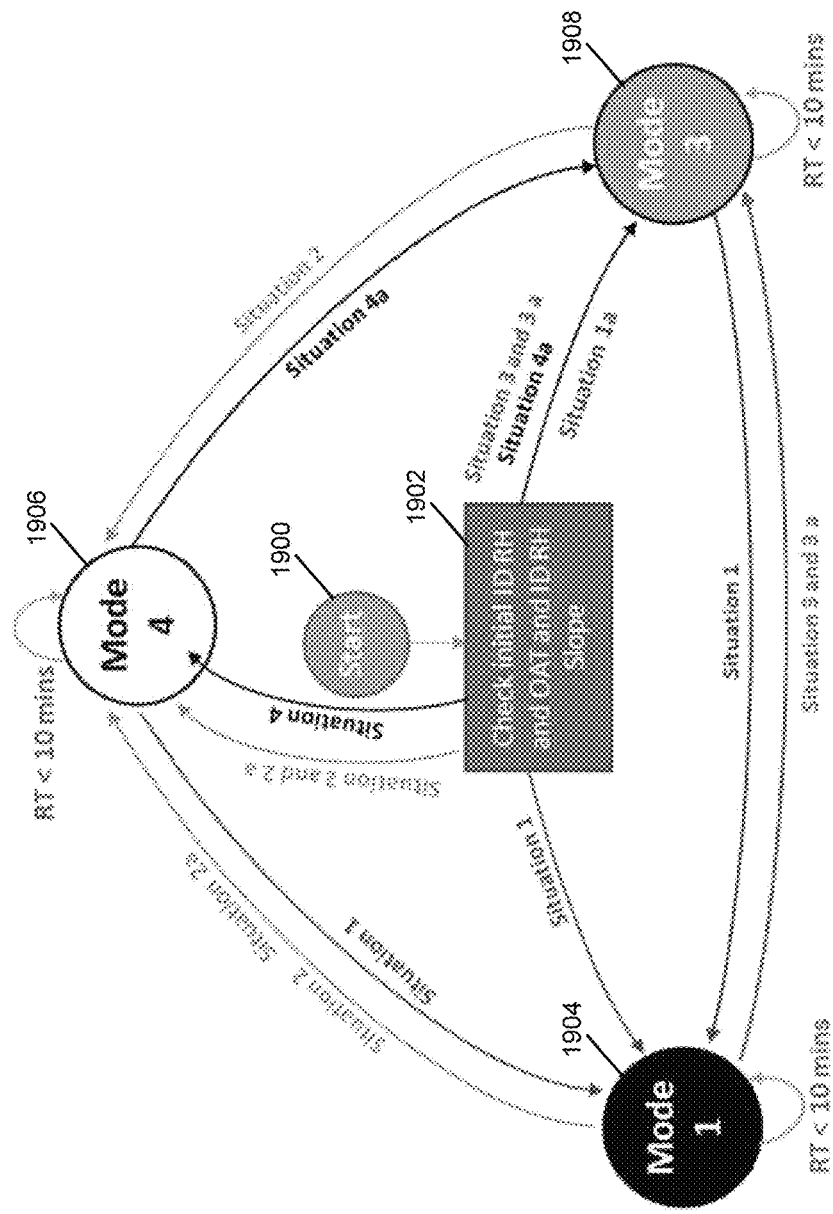
FIG. 19 is a state diagram illustrating another method and algorithm for controlling the variable-capacity compressor and the variable-speed indoor blower.

Referring now to FIG. 19, another method and control algorithm will be described that can be executed by the control module 22. The algorithm may control operation of the compressor 12 and the indoor blower 19 and switch the compressor 12 between the low-capacity and high-capacity modes and the indoor blower 19 between the low-speed and high-speed modes. In this way, as shown in FIG. 19, the control module 22 may switch the system between modes 1, 3, and 4. The method and control algorithm is similar to the previous methods and control algorithms described with reference to FIGS. 17 and 18, except that the method and control algorithm shown in FIG. 19 evaluates eight potential situations, shown as situations 1, 1 a, 2, 2a, 3, 3a, 4, and 4a. Specifically, situation 1 corresponds to OAT less than 90° F., RH less than 50%, and a decreasing RH slope of a predetermined percentage X %. Situation 1a corresponds to OAT less than 90° F., RH less than 50%, and an increasing RH slope of a predetermined percentage X %. Situation 2 corresponds to OAT greater than 90° F., RH less than 50%, and a decreasing RH slope of a predetermined percentage X %. Situation 2a corresponds to OAT greater than 90° F., RH less than 50%, and an increasing RH slope of a predetermined percentage X %. Situation 3 corresponds to OAT less than 90° F., RH greater than 50%, and a decreasing RH slope of a predetermined percentage X %. Situation 3a corresponds to OAT less than 90° F., RH greater than 50%, and an increasing RH slope of a predetermined percentage X %. Situation 4 corresponds to OAT greater than 90° F., RH greater than 50%, and a decreasing RH slope of a predetermined percentage X %. Situation 4a corresponds to OAT greater than 90° F., RH greater than 50%, and an increasing RH slope of a predetermined percentage X %.

The method and control algorithm starts at 1900 when a demand signal is received and the control module 22 proceeds to 1902 to check the initial RH, OAT, and RH Slope. At 1902, when situation 1 applies, the control module proceeds to state 1904 to operate the system in mode 1 for a predetermined runtime, such as ten minutes. At 1902, when situations 2, 2a, or 4 apply, the control module proceeds to state 1906 to operate the system in mode 4 for a predetermined runtime, such as ten minutes. At 1902, when situations 1a, 3, 3a, or 4a apply, the control module 22 proceeds to state 1908 to operate the system in mode 3 for a predetermined runtime, such as ten minutes. At 1904 when situations 2 or 2a apply, the control module 22 proceeds to state 1906 to operate the system in mode 4 for a predetermined runtime, such as ten minutes. At 1904 when situations 3 or 3a apply, the system proceeds to state 1908 to operate the system in mode 3 for a predetermined runtime, such as ten minutes. At 1906 when situation 1 applies, the control module 22 proceeds to state 1904 to operate in mode 1 and when situation 4a applies, the control module 22 proceeds to state 1908 to operate in mode 3. At 1908, when situation 1 applies the control module proceeds to state 1904 to operate in mode 1 and when situation 2 applies the control module proceeds to state 1906 to operate in mode 4. In each case, once a new state is entered, the control module 22 continues to operate the system in that state for the predetermined runtime of, for example, ten minutes. The control module 22 continues to operate the system based on the control algorithm shown in FIG. 19 until the demand signal is withdrawn or deactivated. In such case, the control module 22 waits for a new demand signal to be received and starts the control algorithm attain at step 1900.

In this way, as illustrated in FIG. 19, the control module 22 checks the initial RH, OAT, and RH Slope and determines the operating mode, i.e., mode 1, mode 3, or mode 4. If the RH, OAT, and/or RH Slope change during the demand cycle, i.e., after a particular mode has been assigned, the system runs for at least the predetermined runtime, e.g., ten minutes, in the assigned mode before switching to another mode. The control module 22 can switch the system into a different operating mode in the same demand cycle one or more times. In other words, after switching to another mode after the predetermined runtime, such as ten minutes, the control module 22 may switch the system into a different operating mode and run in that operating mode for the predetermined runtime, such as ten minutes. The control module 22 may also, depending on the RH, OAT, and/or RH Slope, stay in the same operating mode for the entire demand cycle.

Figure 20:
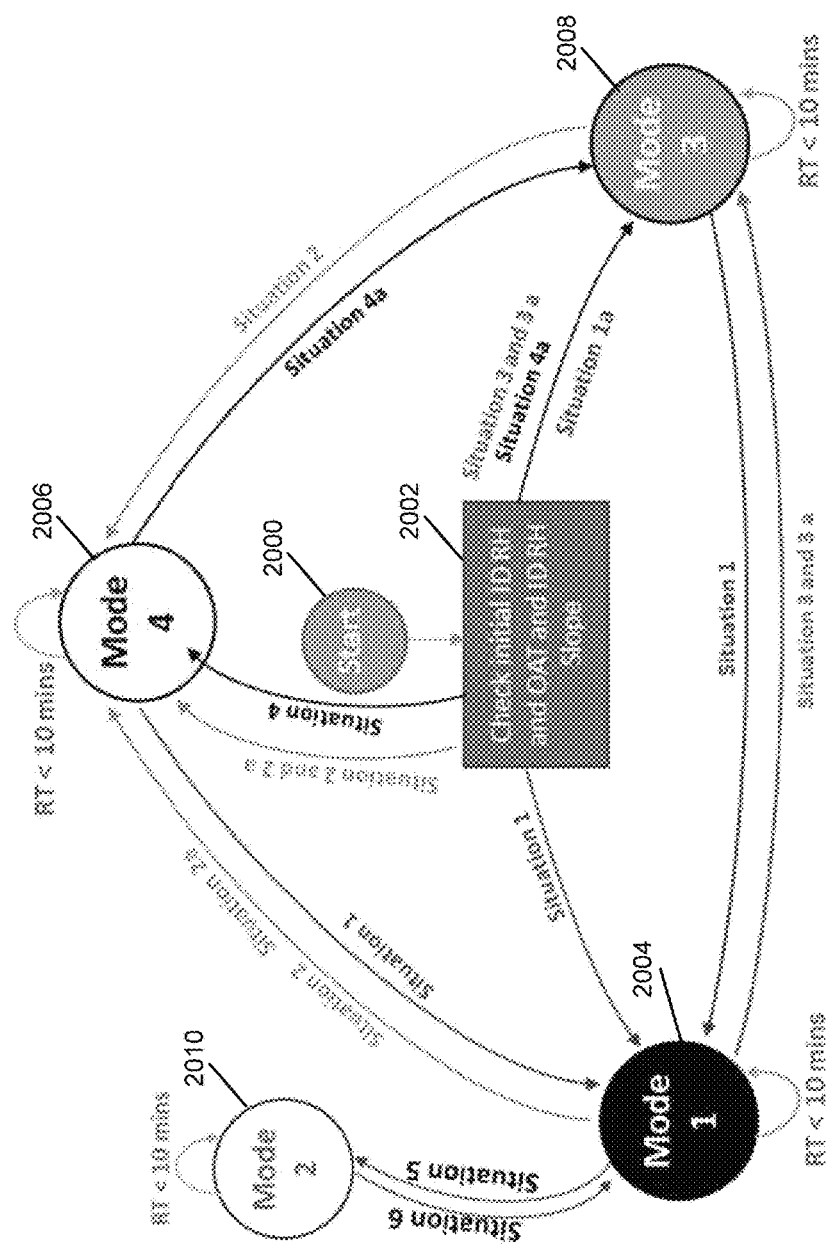
FIG. 20 is a state diagram illustrating another method and algorithm for controlling the variable-capacity compressor and the variable-speed indoor blower.

Referring now to FIG. 20, another method and control algorithm will be described that can be executed by the control module 22. The algorithm may control operation of the compressor 12 and the indoor blower 19 and switch the compressor 12 between the low-capacity and high-capacity modes and the indoor blower 19 between the low-speed and high-speed modes. In this way, as shown in FIG. 20, the control module 22 may switch the system between modes 1, 2, 3, and 4. As shown in FIG. 20, states 2000, 2002, 2004, 2006, and 2008 correspond to states 1900, 1902, 1904, 1906, and 1908, respectively, which are described in detail above with reference to FIG. 19.

However, in addition to the states described above with reference to FIG. 19, the control algorithm shown in FIG. 20 includes an additional state 2010 corresponding to operating the system in mode 2. For example, when the control module 22 is operating the system in mode 1 at state 2004, the control module 22 determines whether situation 5 applies. In situation 5, for example, the OAT is less than 90° F., the RH is less than 50%, and the $T_{stat\ setpoint}$ minus the $T_{stat}$ (i.e., indoor temperature) is less than or equal to 1° F. At state 2004, when situation 5 applies, the control module 22 proceeds to state 2010 and operates the system in mode 2 for a predetermined runtime, such as ten minutes. At state 2010, after operating the system in mode 2 for the predetermined runtime, such as ten minutes, the control module 22 determines whether situation 6 applies. Specifically, situation 6 applies when the OAT is less than 90° F., the RH is less than 50%, and the $T_{stat\ setpoint}$ minus the $T_{stat}$ (i.e., indoor temperature) is greater than 1° F. At state 2010, when situation 6 applies, the control module 22 proceeds to state 2004 and operates the system in mode 1. The control module 22 continues to operate the system based on the control algorithm shown in FIG. 20 until the demand signal is withdrawn or deactivated. In such case, the control module 22 waits for a new demand signal to be received and starts the control algorithm again at step 2000.

In this way, as illustrated in FIG. 20, the control module 22 checks the initial RH, OAT, and RH Slope and determines the operating mode, i.e., mode 1, mode 3, or mode 4. If the RH, OAT, and/or RH Slope changes during the demand cycle, i.e., after a particular mode has been assigned, the system runs for at least the predetermined runtime, e.g., ten minutes, in the assigned mode before switching to another mode. The control module 22 can switch the system into a different operating mode in the same demand cycle one or more times. In other words, after switching to another mode after the predetermined runtime, such as ten minutes, the control module 22 may switch the system into a different operating mode and run in that operating mode for the predetermined runtime, such as ten minutes. The control module 22 may also, depending on the RH, OAT, and RH Slope stay in the same operating mode for the entire demand cycle. In addition, as illustrated in FIG. 20, the control module 22 can use operating mode 2 to increase system run time, which may offer additional comfort by keeping the system running with the compressor 12 in the low-capacity mode and the indoor blower 19 at high speed when the system comes close to meeting the thermostat demand or load. In other words, as the system comes close to meeting the demand or lose, the control module 22 switches the system to mode 2 and after the predetermined runtime, such as the minutes, if the load has not been met and the indoor temperature is more than a predetermined amount, such as 1° F., away from the thermostat setpoint, the control module 22 switches the system back to operating mode 1 to operate for the predetermined runtime, such as ten minutes. Alternatively or additionally, the control module 22 may switch the system from mode 1 to mode 2 when the indoor temperature is decreasing faster than a predetermined rate, i.e., X° F. per a predetermined time period, such as thirty minutes.

Figure 21:
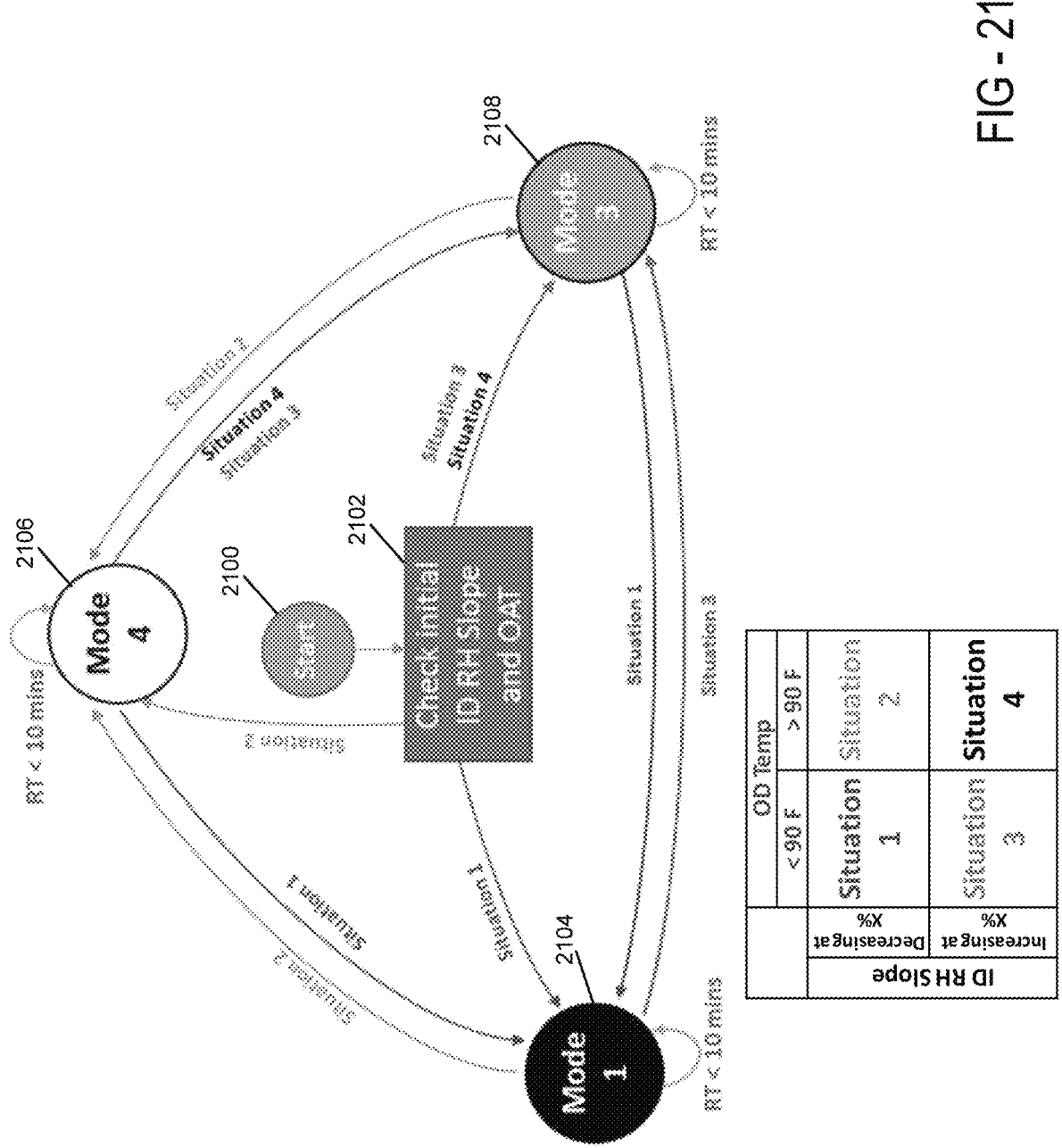
FIG. 21 is a state diagram illustrating another method and algorithm for controlling the variable-capacity compressor and the variable-speed indoor blower.

Referring now to FIG. 21, another method and control algorithm will be described that can be executed by the control module 22. The algorithm may control operation of the compressor 12 and the indoor blower 19 and switch the compressor 12 between the low-capacity and high-capacity modes and the indoor blower 19 between the low-speed and high-speed modes. In this way, as shown in FIG. 21, the control module 22 may switch the system between modes 1, 3, and 4. The method and control algorithm is similar to the previous method and control algorithms described with reference to FIG. 17, except that the method and control algorithm shown in FIG. 21 utilizes four different situations. Specifically, instead of analyzing whether the RH is greater or less than 50%, as was the case in the method and control algorithm of FIG. 17, the method and control algorithm of FIG. 21 analyzes whether RH slope is increasing or decreasing. For example, situation 1 corresponds to OAT less than 90° F. and a decreasing RH slope of a predetermined percentage X %. Situation 2 corresponds to OAT greater than 90° F. and a decreasing RH slope of a predetermined percentage X %. Situation 3 corresponds to OAT less than 90° F. and an increasing RH slope of a predetermined percentage X %. Situation 4 corresponds to OAT greater than 90° F. and an increasing RH slope of a predetermined percentage X %.

The control module 22 starts at 2100 and proceeds to state 2102 once a demand signal is received. At 2102, the control module 22 checks the RH and OAT. At 2102, the control module 22 then checks to see whether Situation 1, 2, 3, or 4 applies. At 2102, when situation 1 applies, the control module 22 proceeds to operate the system in mode 1 at state 2104. At 2102, when situation 2 applies, the control module 22 proceeds to operate the system in mode 4 at state 2106. At 2102, when situations 3 or 4 apply, the control module 22 proceeds to operate the system in mode 3 at state 2108. In each of the modes, the control module 22 continues to operate the system in the corresponding modes at each of the states 2104, 2106, and 2108 for a predetermined runtime, such as ten minutes.

After operating the system for the predetermined runtime, the control module 22 checks the RH and OAT to determine whether it should switch operating modes.

For example, when operating in mode 1 at state 2104, the control module determines whether situation 2 or situation 3 applies. At 2104, when situation 2 applies, the control module proceeds to state 2106 to operate the system in mode 4. At 2104, when situation 3 applies, the control module proceeds to state 2106 to operate the system in mode 3. When operating in mode 4 at state 2106, the control module 22 determines whether situation 1 or situation 4 applies. At 2106, when situation 1 applies, the control module 22 proceeds to state 2104 and operates the system in mode 1. At 2106, when situation 4 applies, the control module 22 proceeds to state 2108 and operates the system in mode 3. At 2108, the control module 22 determines whether situation 1 or situation 2 applies. At 2108, when situation 2 applies, the control module 22 proceeds to state 2106 and operates the system in mode 4. At 2108, when situation 1 applies, the control module 22 proceeds to state 2104 and operates the system in mode 1. In each case, once a new state is entered, the control module 22 continues to operate the system in that state for the predetermined runtime of, for example, ten minutes. The control module 22 continues to operate the system based on the control algorithm shown in FIG. 21 until the demand signal is withdrawn or deactivated. In such case, the control module 22 waits for a new demand signal to be received and starts the control algorithm attain at step 2100.

In this way, as illustrated in FIG. 21, the control module 22 checks the initial RH Slope and OAT and determines the operating mode, i.e., mode 1, mode 3, or mode 4. If the RH Slope and/or OAT change during the demand cycle, i.e., after a particular mode has been assigned, the system runs for at least the predetermined runtime, e.g., ten minutes, in the assigned mode before switching to another mode. The control module 22 can switch the system into a different operating mode in the same demand cycle one or more times. In other words, after switching to another mode after the predetermined runtime, such as ten minutes, the control module 22 may switch the system into a different operating mode and run in that operating mode for the predetermined runtime, such as ten minutes. The control module 22 may also, depending on the RH Slope and/or OAT, stay in the same operating mode for the entire demand cycle.

Referring now to FIG. 22, another method and control algorithm will be described that can be executed by the control module 22. The algorithm may control operation of the compressor 12 and the indoor blower 19 and switch the compressor 12 between the low-capacity and high-capacity modes and the indoor blower 19 between the low-speed and high-speed modes. In this way, as shown in FIG. 22, the control module 22 may switch the system between modes 1, 2, 3, and 4. As shown in FIG. 22, states 2200, 2202, 2204, 2206, and 2208 correspond to states 2100, 2102, 2104, 2106, and 2108, respectively, which are described in detail above with reference to FIG. 21.

However, in addition to the states described above with reference to FIG. 21, the control algorithm shown in FIG. 22 includes an additional state 2210 corresponding to operating the system in mode 2. For example, when the control module 22 is operating the system in mode 1 at state 2204, the control module 22 determines whether situation 5 applies. In situation 5, for example, the OAT is less than 90° F., the RH slope is less than a predetermined slope X %, and the $T_{stat\ setpoint}$ minus the $T_{stat}$ (i.e., indoor temperature) is less than or equal to 1° F. At state 2204, when situation 5 applies, the control module 22 proceeds to state 2210 and operates the system in mode 2 for a predetermined runtime, such as ten minutes. At state 2210, after operating the system in mode 2 for the predetermined runtime, such as ten minutes, the control module 22 determines whether situation 6 applies. Specifically, situation 6 applies when the OAT is less than 90° F., the RH slope is less than a predetermined slope X %, and the $T_{stat\ setpoint}$ minus the $T_{stat}$ (i.e., indoor temperature) is greater than 1° F. At state 2210, when situation 6 applies, the control module 22 proceeds to state 2204 and operates the system in mode 1. The control module 22 continues to operate the system based on the control algorithm shown in FIG. 22 until the demand signal is withdrawn or deactivated. In such case, the control module 22 waits for a new demand signal to be received and starts the control algorithm again at step 2200.

In this way, as illustrated in FIG. 22, the control module 22 checks the initial RH Slope and OAT and determines the operating mode, i.e., mode 1, mode 3, or mode 4. If the RH Slope and/or OAT changes during the demand cycle, i.e., after a particular mode has been assigned, the system runs for at least the predetermined runtime, e.g., ten minutes, in the assigned mode before switching to another mode. The control module 22 can switch the system into a different operating mode in the same demand cycle one or more times. In other words, after switching to another mode after the predetermined runtime, such as ten minutes, the control module 22 may switch the system into a different operating mode and run in that operating mode for the predetermined runtime, such as ten minutes. The control module 22 may also, depending on the RH Slope and OAT, stay in the same operating mode for the entire demand cycle. In addition, as illustrated in FIG. 22, the control module 22 can use operating mode 2 to increase system run time, which may offer additional comfort by keeping the system running with the compressor 12 in the low-capacity mode and the indoor blower 19 at high speed when the system comes close to meeting the thermostat demand or load. In other words, as the system comes close to meeting the demand or load, the control module 22 switches the system to mode 2 and after the predetermined runtime, such as the minutes, if the load has not been met and the indoor temperature is more than a predetermined amount, such as 1° F., away from the thermostat setpoint, the control module 22 switches the system back to operating mode 1 to operate for the predetermined runtime, such as ten minutes.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A system comprising:
    a variable-capacity compressor operable in a first capacity mode and in a second capacity mode that is higher than the first capacity mode;
    a variable-speed blower operable at a first speed and at a second speed that is higher than the first speed; and
    a control module having a processor configured to: (i) receive a demand signal from a thermostat, the thermostat outputting the demand signal to the control module based on a comparison of an indoor air temperature with a setpoint temperature; (ii) receive indoor relative humidity data corresponding to an indoor relative humidity; (iii) compare the indoor relative humidity with a predetermined threshold and determine whether the indoor relative humidity is increasing or decreasing over time; (iii) switch the variable-capacity compressor between the first capacity mode and the second capacity mode based on the demand signal from the thermostat, the comparison of the indoor relative humidity with the predetermined threshold, and whether the indoor relative humidity is increasing or decreasing over time; and (iv) switch the variable-speed blower between the first speed and the second speed based on the demand signal from the thermostat, the comparison of the indoor relative humidity with the predetermined threshold, and whether the indoor relative humidity is increasing or decreasing over time.

2. The system of claim 1 further comprising:
    an indoor relative humidity sensor that generates the indoor relative humidity data.

3. The system of claim 1 further comprising:
    an outdoor-air-temperature sensor that generates outdoor-air-temperature data corresponding to an outdoor-air-temperature,
        wherein the control module switches the variable-capacity compressor between the first capacity mode and the second capacity mode and switches the variable-speed blower between the first speed and the second speed based on the outdoor-air-temperature.

4. The system of claim 1, wherein the control module determines a slope of the indoor relative humidity, switches the variable-capacity compressor between the first capacity mode and the second capacity mode and switches the variable-speed blower between the first speed and the second speed based on the slope of the indoor relative humidity.

5. The system of claim 1, wherein the control module switches the variable-capacity compressor to the second capacity mode and switches the variable-speed blower to the first speed in response to the indoor relative humidity exceeding the predetermined threshold.

6. The system of claim 1, wherein the control module switches the variable-capacity compressor to the second capacity mode and switches the variable-speed blower to the second speed in response to:
    (i) an outdoor-air-temperature exceeding a predetermined amount, and
    (ii) the indoor relative humidity being less than the predetermined threshold.

7. The system of claim 1, wherein the control module switches the variable-capacity compressor to the first capacity mode and switches the variable-speed blower to the first speed in response to:
    (i) an outdoor-air-temperature being less than a predetermined amount, and
    (ii) the indoor relative humidity exceeding the predetermined threshold.

8. The system of claim 1, wherein the control module switches the variable-capacity compressor to the first capacity mode and switches the variable-speed blower to the second speed in response to a difference between the indoor air temperature and the setpoint temperature being less than a predetermined value.

9. The system of claim 1, wherein the control module switches the variable-capacity compressor between the first capacity mode and the second capacity mode and switches the variable-speed blower between the first speed and the second speed based on a geographical region in which the system is installed.

10. The system of claim 1, wherein the variable-capacity compressor is disposed within an outdoor unit and the control module is disposed inside of or adjacent to the outdoor unit.

11. A method comprising:
    receiving, with a control module having a processor, a demand signal from a thermostat, the thermostat outputting the demand signal based on a comparison of an indoor air temperature with a setpoint temperature;
    operating, with the control module, a variable-capacity compressor, wherein the variable-capacity compressor is operable in a first capacity mode and in a second capacity mode that is higher than the first capacity mode;
    operating, with the control module, a variable-speed blower, wherein the variable-speed blower is operable at a first speed and at a second speed that is higher than the first speed;
    receiving, with the control module, indoor relative humidity data corresponding to an indoor relative humidity;
    comparing, with the control module, the indoor relative humidity with a predetermined threshold;
    determining, with the control module, whether the indoor relative humidity is increasing or decreasing over time;
    switching, with the control module, the variable-capacity compressor between the first capacity mode and second capacity mode based on the demand signal, the comparison of the indoor relative humidity with the predetermined threshold, and whether the indoor relative humidity is increasing or decreasing over time; and
    switching, with the control module, the variable-speed blower between the first speed and the second speed based on the demand signal, the comparison of the indoor relative humidity with the predetermined threshold, and whether the indoor relative humidity is increasing or decreasing over time.

12. The method of claim 11, wherein an indoor relative humidity sensor generates the indoor relative humidity data.

13. The method of claim 11 further comprising:
    receiving, with the control module, outdoor-air-temperature data corresponding to an outdoor-air-temperature from an outdoor-air-temperature sensor,
    switching, with the control module, the variable-capacity compressor between the first capacity mode and the second capacity mode and the variable-speed blower between the first speed and the second speed based on the outdoor-air-temperature.

14. The method of claim 11, further comprising:
determining, with the control module, a slope of the indoor relative humidity; and
switching, with the control module, the variable-capacity compressor between the first capacity mode and the second capacity mode and the variable-speed blower between the first speed and the second speed based on the slope of the indoor relative humidity.

15. The method of claim 11, further comprising switching, with the control module, the variable-capacity compressor to the second capacity mode and the variable-speed blower to the first speed in response to the indoor relative humidity exceeding the predetermined threshold.

16. The method of claim 11, further comprising switching, with the control module, the variable-capacity compressor to the second capacity mode and the variable-speed blower to the second speed in response to:
(i) an outdoor-air-temperature exceeding a predetermined amount, and
(ii) the indoor relative humidity being less than the predetermined threshold.

17. The method of claim 11, further comprising switching, with the control module, the variable-capacity compressor to the first capacity mode and the variable-speed blower to the first speed in response to:
(i) an outdoor-air-temperature being less than a predetermined amount, and
(ii) the indoor relative humidity exceeding the predetermined threshold.

18. The method of claim 11, further comprising switching, with the control module, the variable-capacity compressor to the first capacity mode and the variable-speed blower to the second speed in response to a difference between the indoor air temperature and the setpoint temperature being less than a predetermined value.

19. The method of claim 11, further comprising switching, with the control module, the variable-capacity compressor between the first capacity mode and the second capacity mode and the variable-speed blower switches between the first speed and the second speed based on a geographical region.

20. The method of claim 11, wherein the variable-capacity compressor is disposed within an outdoor unit and the control module is disposed inside of or adjacent to the outdoor unit.

* * * * *